US 7,187,326 B2

(12) United States Patent
Beadle et al.

(10) Patent No.: US 7,187,326 B2
(45) Date of Patent: Mar. 6, 2007

(54) SYSTEM AND METHOD FOR CUMULANT-BASED GEOLOCATION OF COOPERATIVE AND NON-COOPERATIVE RF TRANSMITTERS

(75) Inventors: Edward R. Beadle, Melbourne, FL (US); John F. Dishman, Palm Bay, FL (US); Richard H. Anderson, Melbourne, FL (US); Paul D. Anderson, Melbourne, FL (US); Gayle Patrick Martin, Merritt Island, FL (US)

(73) Assignee: Harris Corporation, Melbourne, FL (US)

( * ) Notice: Subject to any disclaimer, the term of this patent is extended or adjusted under 35 U.S.C. 154(b) by 213 days.

(21) Appl. No.: 10/714,673

(22) Filed: Nov. 18, 2003

(65) Prior Publication Data

US 2004/0189525 A1    Sep. 30, 2004

Related U.S. Application Data

(60) Provisional application No. 60/458,038, filed on Mar. 28, 2003.

(51) Int. Cl.
*G01S 3/02* (2006.01)
(52) U.S. Cl. ..................................... 342/451
(58) Field of Classification Search ............... 342/442, 342/443, 451, 463, 464
See application file for complete search history.

(56) References Cited

U.S. PATENT DOCUMENTS

| 4,166,980 A | 9/1979 | Apostolos et al. |
| 4,506,225 A | 3/1985 | Loveless et al. |
| 4,607,305 A | 8/1986 | Milo |
| 4,965,732 A | 10/1990 | Roy, III et al. |
| 5,283,813 A | 2/1994 | Shalvi et al. |
| 5,381,450 A | 1/1995 | Lane |
| 5,459,668 A | 10/1995 | Dogan et al. |
| 5,539,832 A | 7/1996 | Weinstein et al. |
| 5,640,419 A | 6/1997 | Janusas |

(Continued)

FOREIGN PATENT DOCUMENTS

FR        2713799        6/1995

OTHER PUBLICATIONS

Agee, B.G., "The Property Restoral Approach to Blind Adaptie Signal Extraction," Ph.D. Dissertation, Department of Electrical Engineering and Computer Science, University of California, Davis, 1989.

(Continued)

*Primary Examiner*—Dao L. Phan
(74) *Attorney, Agent, or Firm*—Duane Morris LLP

(57) ABSTRACT

A transmitted signal's higher order statistics of temporally dependent waveforms are exploited to geolocate low power signals. The geolocation is independent of the characteristics or encoded data of the transmitted waveform. The method uses spatial fourth order cumulants or spatial second order moments in a Blind Source Separation and generalized eigenvalue decomposition to determine unique matrix pencil eigenvalues and eigenvectors. The eigenvectors provide are orthogonal to the steering vector of the transmitted signal save one, which represents the steering vector. This property is used to determine Steering vectors, AoA or geolocation. The receiver includes a multi-element array and does not need a priori knowledge of the transmitted signal source to geolocate the target transmitter. The methods and apparatus for geolocation does not require typical demodulation.

43 Claims, 19 Drawing Sheets

U.S. PATENT DOCUMENTS

| | | | |
|---|---|---|---|
| 5,651,030 A | 7/1997 | Wong et al. | |
| 5,706,402 A | 1/1998 | Bell | |
| 5,848,160 A | 12/1998 | Cai et al. | |
| 5,893,031 A | 4/1999 | Hoogerwerf et al. | |
| 5,909,646 A | 6/1999 | Deville | |
| 5,959,966 A | 9/1999 | Torkkola | |
| 5,996,406 A | 12/1999 | Ward | |
| 6,021,334 A * | 2/2000 | Aste et al. | 455/561 |
| 6,185,309 B1 | 2/2001 | Attias | |
| 6,208,295 B1 | 3/2001 | Dŏgan et al. | |
| 6,252,962 B1 | 6/2001 | Sagey | |
| 6,310,704 B1 * | 10/2001 | Dogan et al. | 398/9 |
| 6,426,977 B1 | 7/2002 | Lee et al. | |
| 6,449,560 B1 | 9/2002 | Kimball | |
| 6,535,666 B1 | 3/2003 | Dogan et al. | |
| 6,658,234 B1 * | 12/2003 | Dogan et al. | 342/373 |
| 6,711,528 B2 | 3/2004 | Dishman et al. | |
| 6,845,164 B2 | 1/2005 | Gustafsson | |
| 2002/0153891 A1 | 10/2002 | Smith et al. | |
| 2004/0259565 A1 * | 12/2004 | Lucidarme | 455/453 |
| 2005/0212703 A1 * | 9/2005 | Fiore et al. | 342/383 |

OTHER PUBLICATIONS

Abed-Meraim, K., Y. Xiang, J.H. Manton, and Y. Hua, "Blind Source Separation Using Second-Order Cyclostationary Statistics," IEEE Transactions on Signal Processing, vol. 49, No. 4, Apr. 2001, pp. 694-701.

Bai, Z., J. Demmel, J. Dongarra, A. Ruhe, and H. van der Vorst, *Templates for the Solution of Algebraic Eigenvalue Problems: A Practical Guide*. SIAM, Philadelphia, PA: 2000.

Bell, A.J. and T.J. Sejnowski, "An Information-Maximization Approach to Bllind Source Separation and Blind Deconvolution," Neural Computing, vol. 7, 1995, pp. 1129-1159.

Belouchrani, A., K. Abed-Meraim, J.F. Cardoso, and E. Moulines, "Blind Source Separation Using Second-Order Statistics," IEEE Transactions on Signal Processing, vol. 45, No. 2, Feb. 1997, pp. 434-444.

Biglieri, E., J. Proakis, and S. Shamai, "Fading Channels: Information-Theoretic and Communications Aspects," IEEE Transactions on Information Theory, vol. 44, No. 6, Oct. 1998, pp. 2619-2691.

Cardoso, J.F., "Blind Signal Separation: Statistical Principles," Proceedings ofthe IEEE, vol. 9, No. 10, Oct. 1998, pp. 2009-2025.

Cardoso, J.F. and A. Souloumiac, "Blind Beamforming for Non-Gaussian Signals," IEEE Proceedings F, vol. 140, No. 6, Dec. 1993, pp. 362-370.

Cardoso, J.F. and B. Hvam Laheld, "Equivariance Adaptive Source Separation," IEEe Transactions on Signal Processing, vol. 44, No. 12, Dec. 1996, pp. 3017-3030.

Castedo, L. and A.R. Figueiras-Vidal, "An Adaptive Beamforming Technique Based on Cyclostationary Signal Properties," IEEE Transactions on Signal Processing, vol. 43, No. 7, Jul. 1995, pp. 1637-1650.

Chang C., Z. Ding, S.F. Yau, and F.H.Y. Chan, "A Matrix-Pencil Approach to Blind Separation of Non-White Sources in White Noise," Proc. ICASSP98, vol. IV, pp. 2485-2488.

Chang, C., Z. Ding, S.F. Yau, and F.H.Y. Chan, "A Matrix-Pencil Approach to Blind Separation of Colored Non-Stationary Signals," IEEE Transactions on Signal Processing, vol. 48, No. 3, Mar. 2000, pp. 900-907.

Chiang, H.H. and C.L. Nikias, "The ESPRIT Algorithm with Higher-Order Statistics," Proceedings Workshop on Higher-Order Spectral Analysis, Vail Colorado, Jun. 1989, pp. 163-168.

Choi, S. and A. Cichocki, "Blind Separation of Non-stationary and Temporally Correlated Sources from Noisy Mixtures," Neural Networks for Signal Processing X, 2000. Proceedings of the 2000 IEEE Signal Processing Society Workshop, vol. 1, Dec. 2000, pp. 405-414.

Comon, P., "Independent Component Analyysis, A New Concept?," Signal Processing, vol. 36, No. 3, Apr. 1994, pp. 287-314.

Ding, Z., "A New Algorithm for Automatic Beamforming," Proceedings of the 25th Asilomar Conference of Signals, Systems, and Computers, vol. 2, 1991, pp. 689-693.

Ding, Z. and T. Nguyen, "Stationary Points of Kurtosis Maximization Algorithm for Blind Signal Separationi and Antenna Beamforming," IEEE Transactions on Signal Processing, vol. 48, No. 6, Jun. 2000, pp. 1587-1596.

Dogan, M.C. and J.M. Mendel, "Applications of Cumulants to Array Processing—Part I: Aperture Extension and Array Calibration," IEEE Transactions on Signal Processing, vol. 43, No. 5, May 1995, pp. 1200-1216.

Dwyer, R.F., "Classification of Very Wide Bandwidth Acoustic Signals," Oceans 1997, MTS/IEEE Conference Proceedings, vol. 1, pp. 496-499, Oct. 6-9, 1997.

Gabriel, W.F., "Adaptive Processing Array Systems," Proceedings of the IEEE, vol. 80, No. 1, Jan. 1992, pp. 152-162.

Gantmacher, F.R., *The Theory of Matrices, vol. I*. AMS Chelsea Publishing, Providence, RI: 1977.

Gantmacher, F.R., *The Theory of Matrices, vol. II*. AMS Chelsea Publishing Providence, RI: 1989.

Godard, D.N., "Self-recovering Equalization and Carrier Tracking in Two-dimensional Data Communications Systems," IEEE Transactions on Communications, vol. COMM-Nov. 28, 1980, pp. 1867-1875.

Golub, G.H. and C.F. Van Loan, *Matrix Computations*. The Johns Hopkins University Press, Baltimore, MD: 1996.

Haardt, M., et al., "Improved Bearing and Range Estimation via High-Order Subspace Based Unitary ESPRIT," Signals, Systems and Computers, vol. 1, pp. 380-4, Nov. 3-6, 1996.

Halmos, P.R. *Finite-Dimensional Vector Spaces*. Springer-Verlag, New York, NY: 1987.

Harville, D.A., *Matrix Algebra from a Statistician's Perspective*. Sringer-Verlag, Ne York, NY: 1999.

Hayes, M.H., *Statistical Digital Signal Processing and Modeling*. John Wiley and Sons, New York, NY: 1996.

Haykin, S., *Adaptive Filter Theory*. PTR Prentice-Hall, Upper Saddle River, NJ: 1996.

Hyvärinen, A., "Survey on Independent Component Analysis," Neural Computing Surveys, vol. 2, No. 1, 1999, pp. 94-128.

Inouye, Y., "Cumulant-Based Blind Identification of Linear Multi-Input-Multi-Output Systems Driven by Colored Inputs," IEEE Transactions on Signal Processing, vol. 45, No. 6, Jun. 1997.

Johnson, D.H. and D.E. Dudgeon, *Array Signal Processing: Concepts and Techniques*. PTR Prentice-Hall, Englewood Cliffs, NJ: 1993.

Jütten, C. and J. Herault, "Blind Separation of Sources, Part I: An Adaptive Algorithm Based on Neuromimetic Architectures," Signal Processing, vol. 24, 1991, pp. 1-10.

Kanatani, K., *Statistical Optimization for Geometric Computation: Theory and Practic*. Elsevier Science B.V., Amsterdam, The Nethelands: 1996.

Kohno, R., "Spatial and Temporal Communication Theory Using Adaptive Antenna Array," IEEE Personal Communication, vol. 5, No. 1, Feb. 1998, pp. 25-35.

Krim, H. and M. Viberg, "Two Decades of Array Signal Processing Research," IEEE Signal Processing magazine, Jul. 1996, pp. 67-94.

Marchand, P. and J-L Locoume, "Multiple Hypothesis Modulation Classification Based on Cyclic Cumulants of Different Orders," 0-7803-4428-Jun. 1998 IEEE, pp. 2157-2160.

Markus, A.S., *Introduction to the Spectral Theory of Polynomial Operator Pencils, Translation of Mathematical Monographs*, vol. 71. American Mathematical Society, Providence, RI: 1988.

Nandi, A.K., *Blind Estimation Using Higher-Order Statistics*. Kluwer Academic, Dordecht, The Netherlands: 1999.

Nikias, C.L. and J.M. Mendel, "Signal Processing with Higher-Order Spectra," IEEE Signal Processing Magazine, vol. 10, No. 3, pp. 10-37.

Nikias, C.L. and A.P. Petropulu, *Higher-Order Spectra Analysis: A Non-Linear Signal Processing Framework*. PTR Rentice-Hall, Upper Saddle River, NJ: 1993.

Papoulis, A., *Probability, Random Variables, and Stochastic Processes*. WCB/McGraw-Hill, Boston, MA: 1991.

Rosenblatt, M., *Stationary Sequences and Random Fields.* Birkhauser, Boston, MA: 1985.

Roy, R., A. Paulraj, T. Kailath, "Direction-of-Arrival Estimation by Subspace Rotation Methods," Proc. ICASSP86, pp. 2495-2498.

Roy, R. and T. Kailath, "ESPRIT-Estimation of Signal Parameters via Rotational Invariance Techniques," IEEE Transactions on ASSP, vol. 37, No. 7, Jul. 1989, pp. 984-995.

Schmidt, R.O., "Multiple Emitter Location and Signal Parameter Estimation," IEEE Transactions on Antennas and Propagation, vol. AP-34, No. 3, Mar. 1986, pp. 276-280.

Schott, J.R., *Matrix Analysis for Statistics.* John Wiley and Sons, New York, NY: 1997.

Strang, G. *Introduction to Linear Algebra.* Wellesley-Cambridge Press, Wellesley, MA: 1998.

Swami, A. and B.M. Sadler, "Hierarchical Digital Modulation Classification Using Cumulants," IEEE Transactions on Communications, vol. 48, No. 3., Mar. 2000, pp. 416-429.

Tong, L., G. Xu, and T. Kailath, "Blind Identification and Equalization Based on Second-Order Statistics: A Time-Domain Approach," IEEE Transactions on Information Theory, vol. 40, No. 2, Mar. 1994, pp. 340-349.

van der Veen, A.J., S. Talwar, and A. Paulraj, "A Subspace Approach to Blind Space-Time Signal Processing for Wireless Communication Systems," IEEE Transactions on Signal Processing, vol. 45, No. 1, Jan. 1997, pp. 173-190.

Van Dooren, P., "Reducing Subspaces: Definitions, Properties, and Algorithms," Matrix Pencils, Proceedings Pite Havsbad, Lecture Notes in Mathematics 973, Springer-Verlag, New York, NY, 1982, pp. 58-73.

Van Veen, B.D. and K.M. Buckley, "Beamforming: A Versatile Approach to Spatial Filtering," IEEE ASSP Magazine, April 1988, pp. 4-24.

Widrow, B. and S.D. Stearn, *Adaptive Signal Processing.* PTR Prentice-Hall, Upper Saddle River, NJ: 1985.

Yuen, N. and B. Friedlander, "Asymptotic Performance Analysis of ESPRIT, Higher-order ESPRIT, and Virtual ESPRIT Algorithms," IEEE Transactions on Signal Processing, vol. 44, No. 10, Oct. 1996, pp. 2537-2550.

\* cited by examiner

SYSTEM AND METHOD FOR CUMULANT-BASED GEOLOCATION OF COOPERATIVE AND NON-COOPERATIVE RF TRANSMITTERS

RELATED APPLICATIONS

The present application is related to and co-pending with commonly-assigned U.S. patent application Ser. No. 10/360,631 entitled "Blind Source Separation Utilizing A Spatial Fourth Order Cumulant Matrix Pencil", filed on 10 Feb. 2003, the disclosure of which is hereby incorporated herein by reference.

The present application is related to and co-pending with commonly-assigned U.S. patent application Ser. No. 10/400,486 entitled "Method And System For Waveform Independent Covert Communications", filed on 28 Mar. 2003, the disclosure of which is hereby incorporated herein by reference.

The present application is co-pending with and claims benefit of U.S. Provisional Patent Application Ser. No. 60/458,038 entitled "Cooperative SIGINT for Covert Communication and Location Provisional", filed on 28 Mar. 2003, the entirety of which is hereby incorporated herein by reference.

GOVERNMENT LICENSE RIGHTS

The U.S. government has a paid-up license in this invention and the right in limited circumstances to require the patent owner to license others on reasonable terms as provided for by the terms of Contract No. NRO000-02-C-0389 awarded by the National Reconnaissance Office.

BACKGROUND

Information regarding location of a source such as for surveillance or combat search and rescue can be degraded in value if detected by unfriendly entities, such as enemy forces in the case of a downed pilot or a marked terrorist under surveillance.

Intentional detection of the signal or message can be accomplished in military systems that use specially designed electronic support measures (ESM) receivers. These ESM receivers are often found in signal intelligence (SIGINT) applications. In commercial applications, devices employed by service providers (i.e. spectral monitors, error rate testers) can be used to detect intrusion on their spectral allocation. Inadvertent detection can also occur, such as when a user or service provider notices degradation in link performance (e.g., video quality, audio quality, or increased bit error rate).

The term covert also implies the additional goals of evading interception and exploitation by unintended receivers. Interception is the measurement of waveform features or parameters useful for classifying/identifying a transmitter and/or the waveform type and/or deriving information useful for denying (i.e. jamming) the communication. Exploitation is processing a signal by an unintended receiver in the attempt to locate the transmitter and/or recover the message content. In the broad literature on covert communications these characteristics as applied to transmitted information signals are referred to as low probability of detection (LPD), low probability of intercept (LPI), and/or low probability of exploitation (LPE) by an unintended receiver.

Given the desirability to transmit messages covertly, it is helpful to understand considerations that enhance or degrade LPD, LPI and LPE. An unintended receiver such as the receiver 103 in FIG. 1 with the goal of detecting a covert communication must reliably differentiate between the binary noise-only and signal-plus-noise hypothesis. As is known to those of skill in the art, for an unintended receiver the signal detection process is typically based on an energy threshold. The energy the receiver measures is given by $E_{tot} = P_{avg} T_{xmit}$. Where under general conditions the power $P_{avg}$ is the received covert signal power S plus internal receiver noise power N. Hence, $E_{tot} = (S+N) T_{xmit}$. If the signal power used to communicate is only a small fraction of the receiver noise, S<<N, it is extremely difficult for the unintended receiver to reliably detect the presence of the covert signal because the total energy detected will only be marginally greater than the noise-only (S=0) case.

Minimizing transmit power has two direct system benefits. First, the total signal power used will be a small fraction of the total noise power present in the same band. Thus, if the message is limited in time duration, the total energy measured by an unintended receiver 106, which may be an ESM receiver, is indistinguishable from a noise-only environment. Since ESM receivers are often of energy threshold type, there is an obvious trade-off of average power for time duration in order for a signal to remain undetectable. Second, the low transmit power scenario enables usage by transmitters with very limited power supplies (i.e. batteries).

Therefore, as naturally arise in military environments such as depicted in FIG. 2, there is a need for a low power message system and method, covert or otherwise, such as covert communications for Intel or Special Forces, "stealth" IFF for low observable ground vehicles, and combat search and rescue (CSAR). There is also such a need in a number of civilian or public safety applications as well, such as asset tracking/location or "lost child" detection/location and surveillance. In particular in these latter-described applications it may be particularly desirable to receive both a message and location the source of the message.

As mentioned above it is often of interest to geolocate signals, particularly those that may de designed for LPI/LPS. These included spread spectrum signals, spread spectrum a signals are intentionally low power as previously discussed, and these signal can also be co-channel with many other signals of similar type, which makes geolocation by prior art methods and systems ineffective.

Embodiments of the present inventive system and method address the above needs while requiring only an extremely low power signal. The geolocation needs are specifically addressed by estimating two cumulant matrices, and performing generalized eigenvalue decomposition (GEVD) of the resulting matrix pencil. The GEVD provides eigenvectors orthogonal to the incoming steering vectors, save one. Exploiting this property allows estimating of steering vectors for each incoming signal. From the steering vectors it is easy to arrive at AOA or geolocation. The embodiments enable geolocation signals that are below thermal noise and in co-channel environments.

These and other advantages of the disclosed subject matter will be readily apparent to one skilled in the art to which the disclosure pertains from a perusal or the claims, the appended drawings, and the following detailed description of the preferred embodiments.

DETAILED DESCRIPTION

Figure 1:
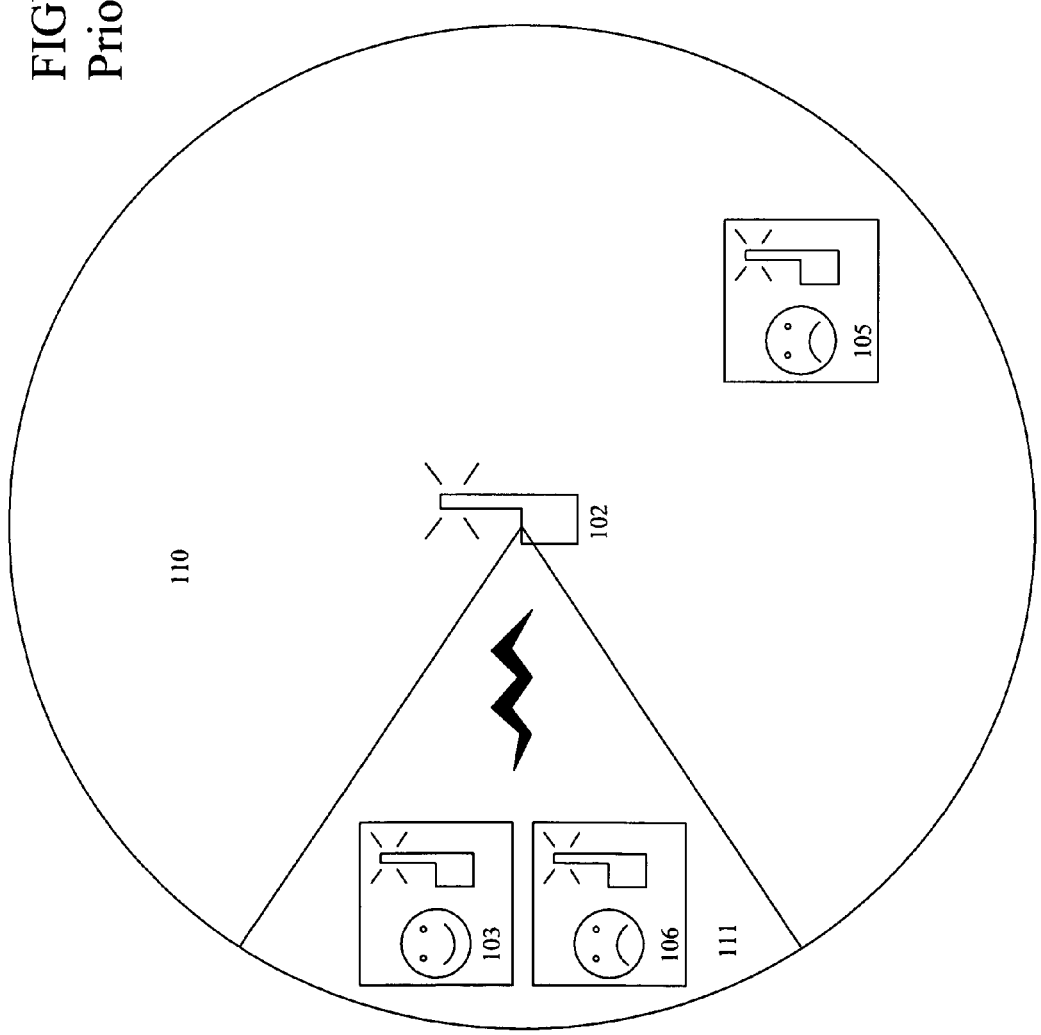
FIG. 1 is a general representation of a prior art approach to LPD.
Figure 2:
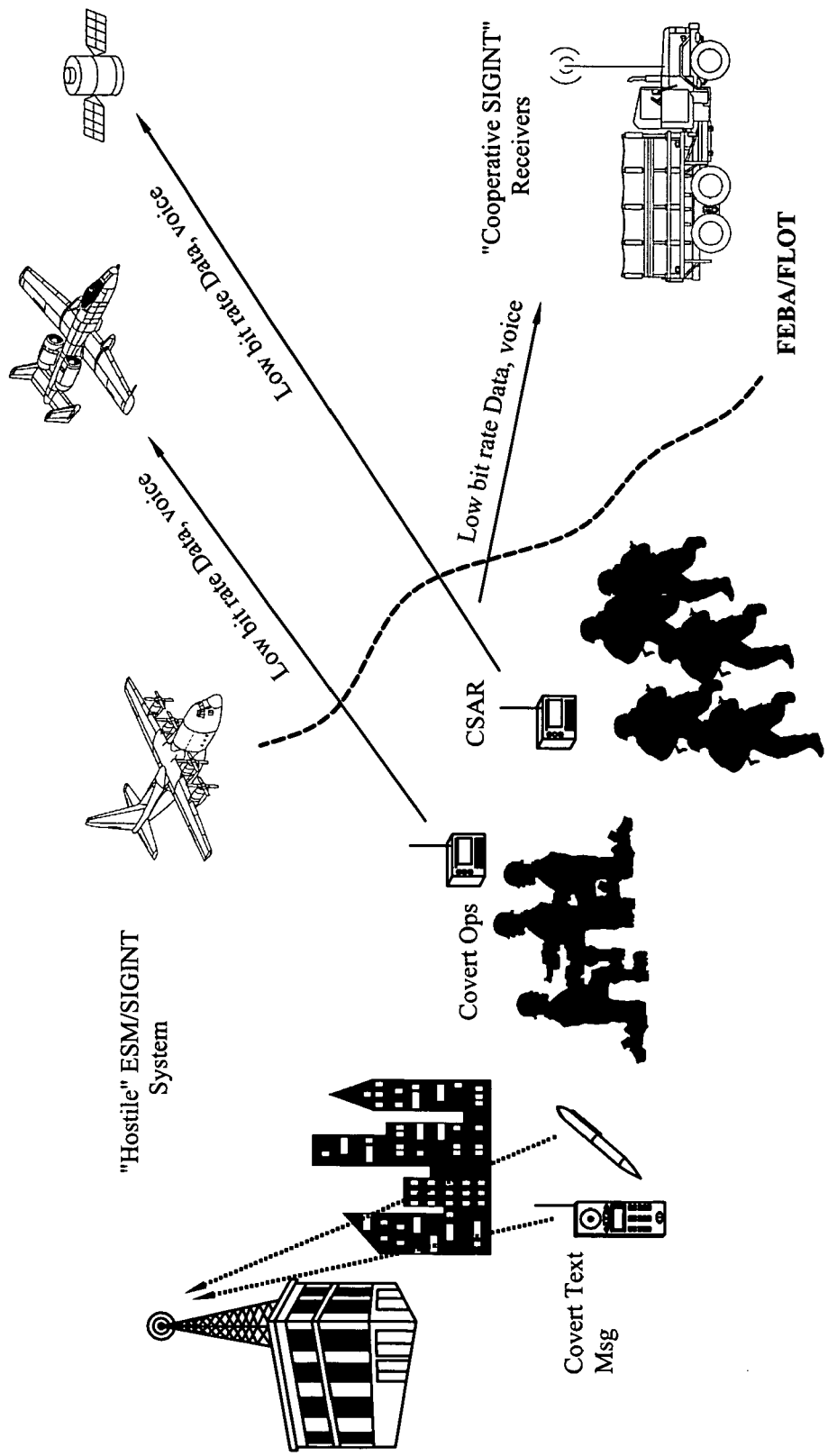
FIG. 2 depiction of covert scenarios.

A useful feature of embodiments described herein is the ability to geolocate a remote transmitter independent of the waveform or protocol used. The individual waveforms used to communicate are in a sense superfluous or independent of the message to be conveyed. This is a significant advantage for ubiquitous application, allowing for parasitic use of present communication infrastructure and devices. Thus there are few restrictions on the pairing between potential covert transmitters and the intended receiver using the disclosed covert communication methods and apparatus because of the independence of the information transfer on the "carrier waveform". This is unlike prior art systems where the receivers designed or instantiated for a certain signal type cannot accurately recover the message if the receiver is presented with another signal type. However, embodiments of the present invention by contrast can function equally well for any waveform, and the location system does not require any a priori knowledge of the "carrier waveform". In fact, embodiments of the covert transmitter can be waveform agile without informing the intended receiver.

The embodiments herein are predicated on selecting and transmitting carrier waveforms with unique higher order spatial statistics. Such higher order statistics include $2^{nd}$ order spatial moments and $4^{th}$ order spatial cumulants. The primary restriction is that the receiver and transmitter must use the same "codebook" of time durations and alphabet.

To recover the message information, the waveform is not conventionally demodulated. Rather, a straightforward block or batch estimation algorithm estimates the generalized eigenvalues of the SFOCMP for each signal in the receiver field-of-view (FOV) over time using only the array output. For this discussion we assume the data has been digitized appropriately. The sizing for the block processing (e.g., the block of contiguous array observations, sometimes known as "snapshots") is dependent on several factors. Chiefly we must ensure that each block has enough sample support so that the eigenvalue estimates from the GEVD of the SFOCMP in each block over a symbol duration nominally match. This means that estimation error is negligible. Accordingly, changes in the eigenstructure can be reliably detected, and this change indicates a symbol boundary. The degree to which a nominal match is required within a block depends on the complexity of the signal environment (e.g., extraneous co-channel signals), the communication errors (e.g., partially received messages) tolerable in a given application, and the receiver processing resources to recover the message in a timely manner.

Further, in practical situations, as power sources become impaired (e.g., batteries running low on power), transmitted waveforms become increasingly distorted. This situation limits the effectiveness of matched filtering as used in prior art systems, since the concept of matched filter relies on knowledge of the transmitted waveform in the receiver. Embodiments of the inventive technique are impervious to such distortion since it is the duration and not the actual value of the eigenvalues of the SFOCMP that matter. So as long as the eigenstructure characteristic of the distorted signals is nominally constant during a message symbol, the inventive system and method is robust as to degraded transmitter performance. Therefore, the present inventive system and method will operate successfully under conditions that would normally be detrimental to conventional systems. The use of lower order matrix pencils are also contemplated by the present inventive system and method.

The digital data can also include framing or formatting of the message. Typical of the framing would be start/stop and data fields. Though other fields can be used as needs dictate. This framing structure can ensure that the receiver can reliably find the beginning of a message for synchronization. Source coding or compression could also be applied to the incoming data stream to reduce the required bandwidth. The user may also encrypt the data to protect it by an optional encryption device of suitable complexity. This data is then output to the forward error correction (FEC) module, which currently is envisioned as applying block coding. The coding is useful to aid the receiver in resolving message ambiguities say caused by fades or other unresolved time coincident measurements, which in this system could be processed as "erasures" up to the correction capability of the code. Thus, the potential for a message protocol using automated repetition of the message might be advantageous as error patterns in each transmission will likely be different.

The "carrier waveform" has its fourth-order characteristic modified according to the control by the M-ary alphabet. There is no limit to the strategies potentially adopted by the covert transmitter for this operation, so long as the characteristic is measurable reliably by the receiver and it conforms to the time duration and alphabet size assumed by the receiver. To this end, there will be some minimum duration and maximum duration for a symbol, and a preferred duration increment for each symbol in the alphabet. The exact choices depend on application, however, making the durations too disparate can negatively affect data rate limiting this technique to lower data rate applications. It is desirable to provide durations that are easy to resolve into the M-ary symbols.

The minimum duration and duration increment must be such that synchronizing the data block boundaries used in the receiver to that of the symbol timing in the transmitter 302 is not relied upon. It is desirable that the covert transmitter 302 use a fundamental signaling period of several (e.g., 10) "receiver block" durations for the minimum signal, and may have a signaling duration increment of the same size to define the alphabet. However other choices are applicable depending on the particular implementation and application. The goal is to make the time duration alphabet as disparate as possible while meeting performance objectives (e.g., data throughput). Sample data rate computations can be determined as shown below.

Defining S as the array snapshots/block, "b" blocks for the minimum length symbol, "B" blocks for the maximum length symbol, and "R" as ADC (analog to digital converter) conversion rate in the receiver, the minimum and maximum symbol durations for a binary alphabet are:

$$T_{sym}(\min)=S*b*1/R=5{,}000*10*10^{-9}=50\times10^{-6} \text{ sec}$$

$$T_{sym}(\max)=S*B*1/R=5{,}000*20*10^{-9}=100\times10^{-6} \text{ sec}$$

The values b=10 and B=20 along with S=5,000 and R=1 Gsamples/sec are subject to implementation choice, and used here for illustration only. Assuming that a system would have an equal number of binary symbols of each type, the average (over the long-term) data rate is nominally 13 kbps. If M-ary signaling is implemented with the same maximum and minimum symbol durations, the data rate can be improved by factor of $\log_2(M)$, but at potentially increased channel BER. Achievable data rates are in principle limited by operating conditions (received SNR, tolerable BER, cumulant estimation errors, etc.). In addition to reliably detecting a change in the SFOCMP eigenvalues using a basic correlation technique, a minimum b consecutive blocks are required (currently b=4) for each of S vector samples from the receive array, thereby making the theoretical minimum symbol duration equal to bS(1/R). Similarly, the incremental time duration for the alphabet should be at least ES(1/R), where E is the number of blocks desired by the designer to provide a balance between adequate safety margin in the time duration decision process and required throughput rate. In theory, E can be as low as unity which would enhance the achievable signaling rate for a fixed alphabet size. However, this is likely not a practical choice since numerous errors can occur due to the receive block processing not being time aligned to transmitter symbol boundaries.

The receiver 303 uses an N-element (or port) receive array 327 and an RF processor 305 to obtain the transmitted signal. In order to capture the temporal character (i.e. the time duration modulation of the SFOCMP eigenvalues) of the covert signal, the array data is first sampled and digitized at some rate suitable for the application. Each array output is digitized simultaneously producing a vector observation in the vector digitizer and buffer 307. The array output data is buffered and subdivided into non-overlapping blocks in 307. Block-wise across signal samples (i.e. the vector observations) are then collected from an array at the intended receiver aperture and the cumulants are block estimated, the matrix pencil is formed, and the generalized eigenvalue decomposition (GEVD) is performed by the Blind Source Separation processor 309. The operation of the BSS requires the selection of a triplicate of time lags provided by the time lags selection device 311. The GEVD provides a set of N eigenvalues $\lambda_k^{(b)}$ and N eigenvectors $V_k^{(b)}$, where k=1, 2, 3, . . . , N (i.e. assuming an N-port array is used) for each block of data. The superscript b is used as a block counter in the receiver. We assume there are $M_s$ generalized eigenvalues representing the SFOCMP properties for each of the $M_s$ signals in the field of view (FOV) of the receive array 327, $M \leq N$. The remaining N-$M_s$ eigenvalues are of the indeterminate (i.e. 0/0 type). Thus when using a sequence of block estimates for the SFOCMP eigenvalues of the $M_s$ consistent signals will be apparent. Further processing is required and performed in the communication receive processor 319 to assemble valid messages. A major part of this processing is to use spatial information available from the GEVD processing. The spatial information regarding the transmitter location and the message content are linked in a 1:1 fashion by the generalized eigenvalues produced by the processing in 309. Using the "side information" of the available spatial variable greatly eases message recovery since we assume that a transmitter spatial location will be "slowly" varying (i.e., changing at a rate much less than the symbol rate of the message), hence a message can be reconstructed in part by looking for message symbols represented by eigenvalues and their durations, associated with a "consistent" location. The designer must ensure that the symbol duration alphabet has sufficient minimum support and increments such that the practical time duration recovery issues where ambiguous results can be obtained do not adversely affect the system performance.

As may be apparent to those of skill in the art, there may be some advantage to overlapping blocks of the data. However, the following discussion deals with non-overlapping blocks. On each block, the two fourth-order spatial cumulant matrices required to form the SFOCMP are formed using pre-selected delay triplets. The delays can be either pre-selected, or subjected to online modification using a programmed search routine (if necessary). This search routine might be necessary when certain conditions, such as repeated eigenvalues for different signals are encountered. However, provisions are made for signals whose eigenstructure match at the delays selected to be repressed at different delays to provide improved discrimination if desirable. After the matrix pencil is formed, the GEVD is computed. From the GEVD, the eigenvalues and eigenvectors are used to determine the signal environment over time block b. Subsequently, the eigenvectors are used to determine the signal steering vectors and then the eigenstructure is correlated block wise in the Blockwise Eigenvalue Correlator 313 to determine any changes in the signal environment. A change, such as symbol boundary, in the communication signal will alter its contribution to the signal environment eigenstructure, measured by the SFOCMP, in a detectable manner. This means a "significant" movement in the complex plane of eigenvalues. As signal changes are detected, those signals are cued for storage in the signal history database 317. As part of the storage procedure, the spatial location of the signal is determined (i.e., either angle-of-arrival (AOA) or geolocation, whichever applies given the specific application) by the AOA/Geolocation processor 315. Additionally, the steering vector can be recorded, which is useful when refined spatial information is unavailable and the relative motion of the transmitter and receiver is negligible. The eigenvalues no longer correlating with the present signal structure are also written to the database. The temporal support (i.e. durations) of the eigenvalues no longer correlating with the current signal structure is measured and stored. All this data is formed and recorded in the signal history database 317 along with other ancillary data that may be useful for signal post-processing applications such as data mining or covert message recovery.

An important function of a tracker is the track initiation and deletion logic. An embodiment of the tracks uses a fixed distance and a fixed number of consecutive "good associations" for initiation and a single "no association" for a track deletion. A "good association" is any measurement that is "close enough" to track. A "no association" condition occurs when all the measurements are "Too far" from a particular track. the distance indicative of an good association can be set empirically or experimentally. Track initiation and track deletion strategies can also be used to adapt to various situation. A Kalman-like approach to association gates can be adapted as the number of observation for a track are accumulated. Such an approach also has the advantage of replacing fixed averaging of the measurements.

The design also allows for multiple access for communications. Consider the case where multiple remote covert emitters are sending data. It is unlikely that they would have exactly the same fourth-order cumulant representation, even if they are using the same base waveform. This is because any deviation from nominal waveform implementation (e.g., frequency change, waveform change, matrix pencil eigenvalue change, phase noise, I/Q imbalance, timing jitter, phase jitter, symbol rate change, pulse shape change, a fourth-order statistic change, relative rotational alignment of a signal constellation change, power amplifier rise/fall time change, and Doppler shift change) causes the fourth-order statistics of these signals to differ. Further, the multiple access signals are assumed distinguishable by spatial location. Of course this requires enough data to be collected to resolve the location, and the array must also provide such resolving power. But, if automated location is not possible at the receiver, due to, for instance, no calibration, the covert transmitters may still have multiple access if the multiple access signals can be assured uniqueness amongst themselves and the environment of sufficient degree in the SFOCMP eigenvalues. The receiver need not know the exact eigenvalues that will be used, but in this mode it is incumbent on the individual transmitters to use one and only one eigenvalue and not switch waveforms. In principle, correlation algorithms to properly sort this data are readily imaginable, though the details depend specifically on the signal designs.

Figure 4:
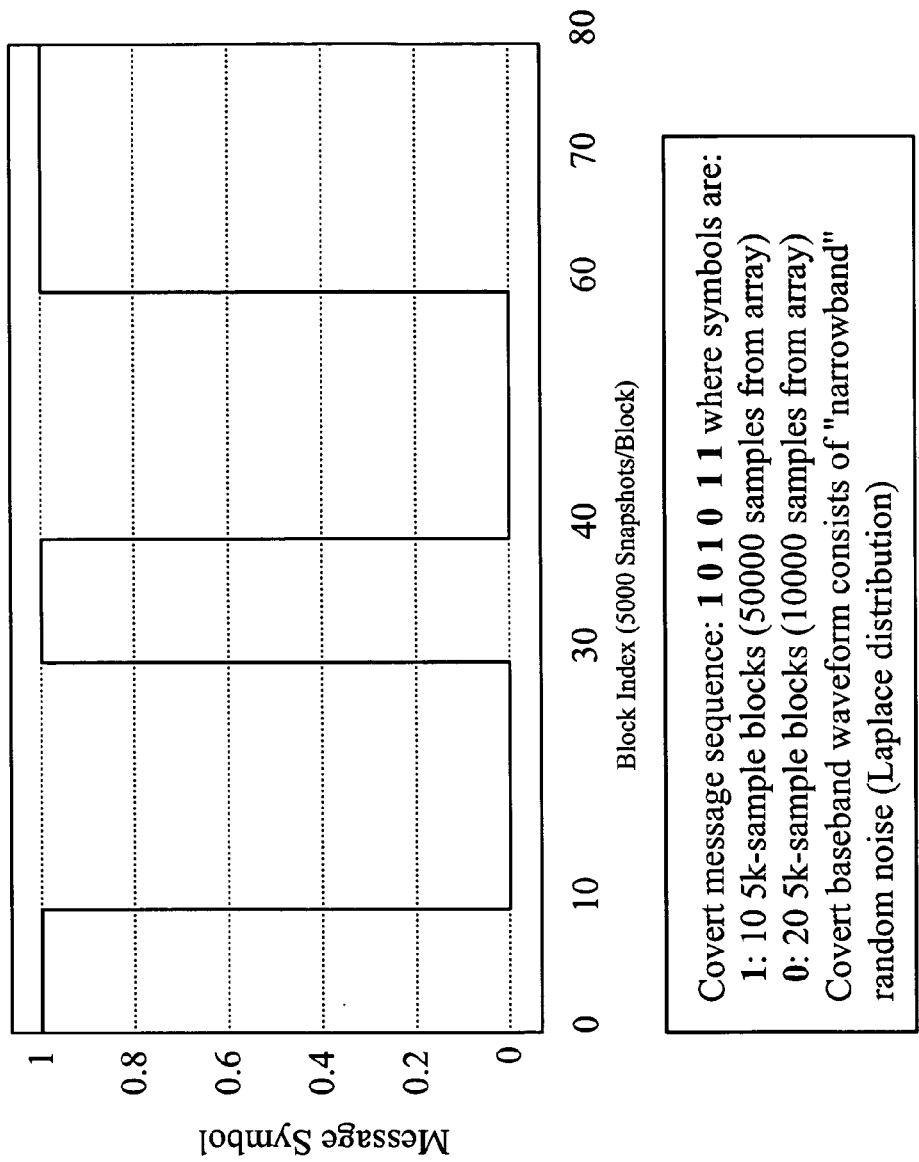
FIG. 4 is a depiction of a binary symbol message 101011 according to an embodiment of the invention.
Figures 5A, 5B:
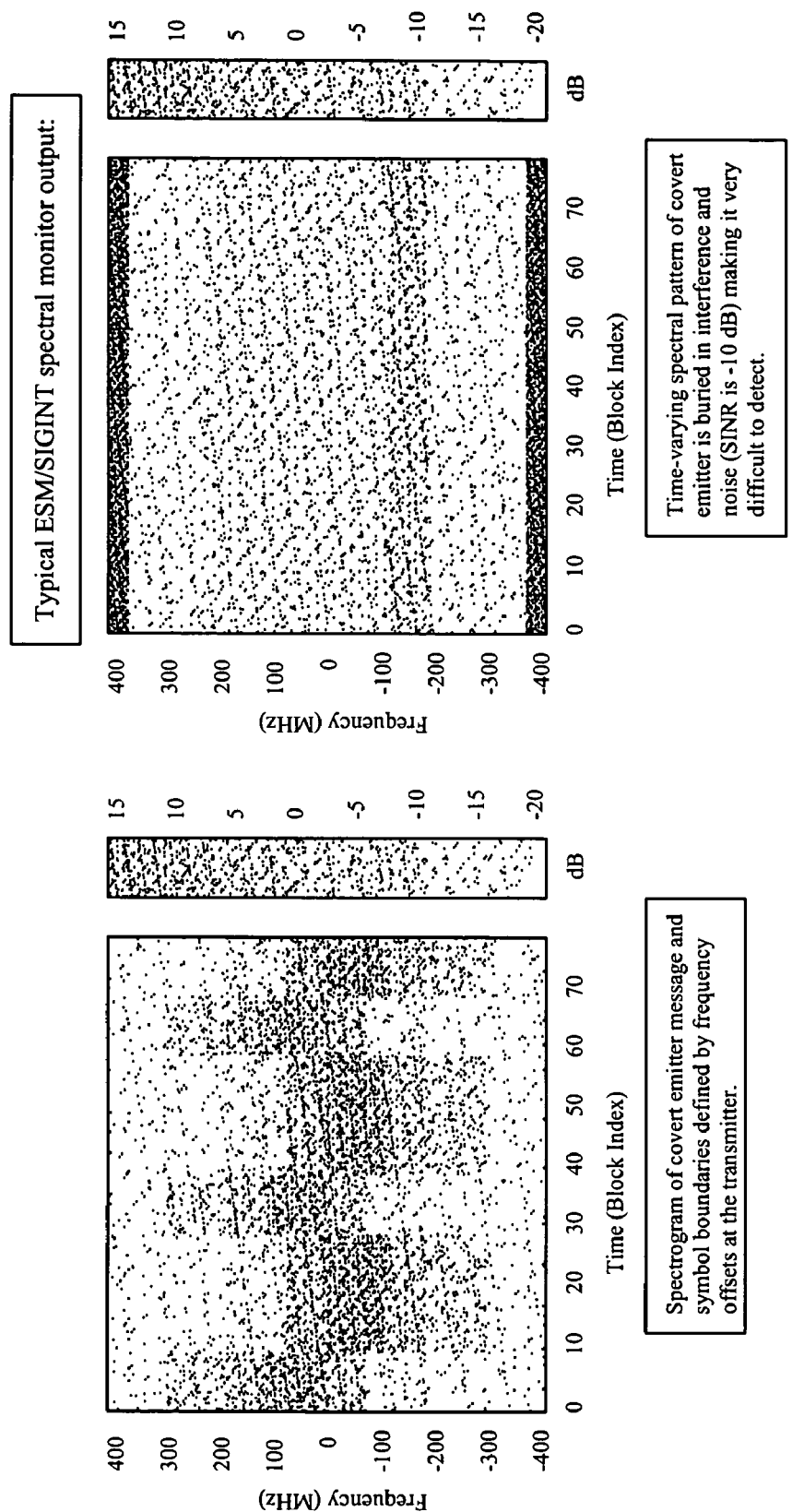
FIG. 5a is a representation of a spectrogram of a transmission of the binary symbol message depicted in FIG. 4 and revealing the symbol boundaries of the message according to an embodiment of the invention.
FIG. 5b is a representation of a spectrogram of a transmission of the binary symbol message depicted in FIG. 4 as might been seem by a typical ESM/SIGINT spectral monitor.

FIG. 5a is a spectrogram of the emitter message shown in FIG. 4 when using the frequency shifts of the preferred embodiment discussed herein. The symbol boundaries defined by frequency offsets at the transmitter are clearly evident in the spectrogram. FIG. 5b is a representation of a typical Electronic Support Measures (ESM) receiver/Signal Intelligence Spectral Monitor output viewing the received signal of FIG. 5a. With reference to the spectrogram shown in FIG. 5b, the time varying spectral pattern of the message shown in 5a is buried in interference and noise (SNIR<−10 db) making the covert message very difficult to detect, and thus even more difficult to intercept and exploit. As is know to those of skill in the art the acronym SNIR stands for Signal to Noise and Interference Ratio.

Given an environment with several interferers and the already negative received SNR an unintended receiver (even using a front-end filter) will likely not reliably detect the presence of the covert signal. But even if a machine detects the presence of the signal energy, it would likely not be acted upon since it would fail all modulation recognition tests and show no exploitable temporal structure. The signal represented in FIG. 4b is frequency shifted Laplacian (double-exponential) Noise. Viewed by a casual observer the signal would mimic additional thermal noise, hence even if detected by an energy detector of suitable design, the detection would likely be discarded.

A mathematical element of the invention is the use of spatial high order statistics to separate signal sources, such as a blind source separation algorithm that utilizes a normalized spatial fourth-order cumulant matrix pencil and its generalized eigenvalue decomposition (GEVD). The equations presented herein use the following subscripting convention. Quantities relating to the array observations available to the system are denoted with a boldface subscript x. However, the subscript should not be confused with the representation of the vector observation from the array output, also denoted as a boldface x. From the context the meanings shall be clear to those of skill in the art. Further, quantities relating to the propagating signals impinging on a receive array are denoted with a boldface subscript r. Following this convention, the matrix pencil of the array output data is given as is given as equation 1. An assumption is made that the received signals r comprising the vector observation of the array output x are independent. Therefore the spatial fourth-order cumulant matrix pencil (SFOCMP) of the array output $P_x$ can be written as:

$$P_x(\lambda,\tau) = C_x^4(0,0,0) - \lambda C_x^4(\tau_1,\tau_2,\tau_3) \quad (1)$$

where the arguments of the pencil $P_x$ represent a generalized eigenvalue, $\lambda$, and a triplet of time delays, $\tau$. The theoretical set of finite generalized eigenvalues turns out to be the inverse of the normalized fourth-order autocumulants of the M signals, $$\{r_i(t)\}_{i=1}^{M}$$

in the field of view (FOV) during the observation interval. The terms $C_x^4$ represent the spatial fourth-order autocumulant matrices. The arguments of the terms indicate the triplet of time delays used to form the matrices. The explicit computation is given as $$[C_x^4(\tau_1, \tau_2, \tau_3)]_{rc} \equiv \sum_{i=1}^{N} Cum[x_i^*(t-\tau_1), x_i(t-\tau_2), x_r(t), x_c^*(t-\tau_3)]$$

where the matrix is N×N, and the subscript rc indicates the element in the $r^{th}$ row and the $c^{th}$ column. The subscript on the function x in the argument on the right-hand side, indicates which array port i,r,c=1,2 . . . ,N, is being used. Because of the unique definition of the pencil of the array output data $P_x$ is related to the pencil of the impinging signals $P_r$ as given in equation 2:

$$P_x(\lambda, \tau) = C_x^4(0, 0, 0) - \lambda C_x^4(\tau_1, \tau_2, \tau_3) \quad (2)$$
$$= V[C_r^4(0, 0, 0) - \lambda C_r^4(\tau_1, \tau_2, \tau_3)]V^H$$
$$= VP_r(\lambda, \tau)V^H$$

The quantity V shown in equation 2 is a $N \times M_s$ matrix composed of the steering vectors for each signal impinging on the array, where N is the number of array ports available to the user and $M_s$, $M_s \leq N$, is the number of signals. In a very simplistic and idealized case the well-known array propagation vector is a steering vector (i.e., the time delay is represented as phase). However, in general if the array is well-designed (i.e., no grating lobes) and the signals are emitted from non-identical locations, then the matrix V is of full rank. This guarantees an equivalence between the eigen structure of the pencils $P_r$ and $P_x$.

Since $P_r$ is a pencil solely of the received signals, and the signals are assumed independent, then by virtue of the properties of cumulants, the pencil $P_r$ is diagonal. This property does not hold true for the pencil formed with the array output data x. However, because of "equivalence" finite eigenvalues of $P_x$ are the finite eigenvalues of $P_r$, access to an exploitable high-order statistical property the eigenstructure of the SFOCMP is available. As introduced here these eigenvalues represent the fourth-order characteristics of each received signal. Specifically, each signal in $$\{r_i(t)\}_{i=1}^M$$

contributes one finite eigenvalue, and it is expressed as the inverse normalized fourth-order autocumulant for that signal as expressed by equation 3.

$$\lambda_m = \frac{c_{r_m}^4(0, 0, 0)}{c_{r_m}^4(\tau_1, \tau_2, \tau_3)} \quad \text{for } m = 1, 2, \ldots, M \quad (3)$$

where the terms $c_{r_m}^4$ represent the individual fourth-order cumulant terms for each signal. These terms are actually the diagonal terms of the pencil $P_r$ as shown in equation (4).

Thus the GEVD of the two pencils $P_x$ and $P_r$ have the same set of finite solutions for the eigenvalues. The eigenvalues are the terms where the rank of the pencil is reduced. It should be readily apparent that values given by equation (3) are the eigenvalues of the pencil equation (1).

These eigenvalues are available to an analysis system, and in theory are independent of system Gaussian noise level given sufficient length data records. The eigenvalues are implicit characteristics of the signals carrying the emitter's covert message in each symbol duration. To exploit this property, as mentioned before, the receiver will typically form blocks or batches of received data for the purpose of correlating the eigenstructure over time to determine patterns of persistent values (FIG. 3) augmented by the availability of spatial data. It is important to recall that only the time duration of the emitter's statistical characteristic as measured by the SFOCMP is relevant, and not the exact values. Hence, the emitter is completely free to choose the "carrier waveforms" at will (FIGS. 6a–f).

The steering vectors can be estimated from the cumulant data for each signal in the FOV of the receiver. A cumulant matrix formed by the receive data, say $C_x^4$ (0,0,0) and for each eigenvector available from the pencil $P_x$ forms, $$C_x^4(0, 0, 0)e_x^{(j)} = \left[\sum_{i=1}^M c_{r_i}(0, 0, 0)v_i v_i^H\right] e_x^{(j)} = \beta v_i$$

The last equality follows directly from the fact that each eigenvector of the SFOCMP $P_x$ is orthogonal to each signals steering vector, $v_i^H e_x^{(j)} = 0$ when $i \neq j$. This fact is generated by the unique construction of the SFOCMP and the definitions of the cumulants.

Figure 3:
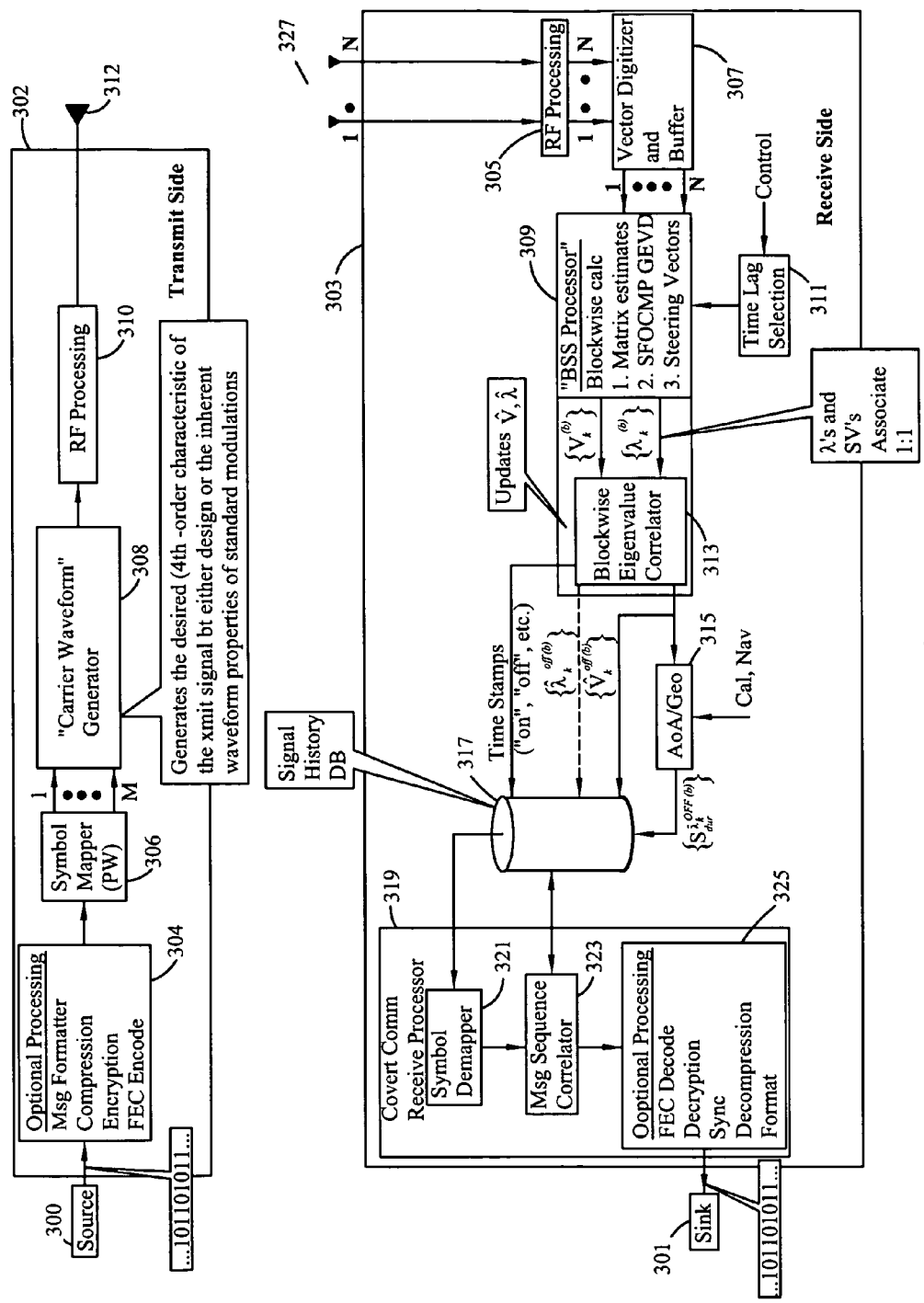
FIG. 3 is a representation of an embodiment of a waveform independent covert communication system.

In FIG. 3, the Blind Source Separation processor 309 forms and applies a separation Matrix and enumerates the number of sources. As described above, from an array output the spatial $4^{th}$ order cumulant matrices are estimated and the estimates are used to determine the eigen analysis for the first-order matrix pencil. Signal detection and enumeration providing the number of source is performed and the separation matrix from the pencil eigenvectors is accomplish. The separation matrix is also used to determine spatial variables, such as steering vectors, AoA or geolocation in block 315 of FIG. 3.

There are numerous ways the covert transmitter can control the desired characteristic of its emitted waveform, some of which leave lower-order statistics unchanged. For example altering the channel filter (i.e. Nyquist pulse shaping) between maximum phase and minimum phase realizations is undetectable in the second-order domain (i.e. power spectra), but evident in the fourth-order domain as measured by our SFOCMP. Also one could conceive on signaling with $$P_r(\lambda, \tau) = \begin{bmatrix} c_{r_1}^4(0, 0, 0) - \lambda c_{r_1}^4(\tau_1, \tau_2, \tau_3) & 0 & \cdots & \cdots & 0 \\ 0 & \ddots & & & \vdots \\ \vdots & & c_{r_j}^4(0, 0, 0) - \lambda c_{r_j}^4(\tau_1, \tau_2, \tau_3) & & \vdots \\ \vdots & & & \ddots & \vdots \\ 0 & \cdots & \cdots & & c_{r_M}^4(0, 0, 0) - \lambda c_{r_M}^4(\tau_1, \tau_2, \tau_3) \end{bmatrix} \quad (4)$$

kurtosis, a fourth-order statistic, applied in the transmitter. Or, one could simply shift between classic waveforms, for example, BPSK, GMSK, QPSK, QAM, or potentially even just variants (i.e. constellation rotations, different pulse shape filters) of a fixed modulation type. There also exists the possibility that the "carrier waveforms" might be chosen as chaotic to appear more noise-like or designed using numerical techniques and generated using direct synthesis in a transmitter.

In any scheme adopted, the information transfer from the transmitter to the receiver is contained in the duration of the change in the eigenvalues of the SFOCMP, not the particular eigenvalues. Since our technique is independent of the particular eigenvalue, it is independent of the waveforms used by the emitter. Which allows, in principle, any transmitter to make use of the receiver having the capability to exploit fourth-order cumulants. The degree to which a specific emitter wishes to "hide" from say conventional ESM receivers holds the implications on the implementation details of the "carrier waveforms".

Figures 6A, 6B:
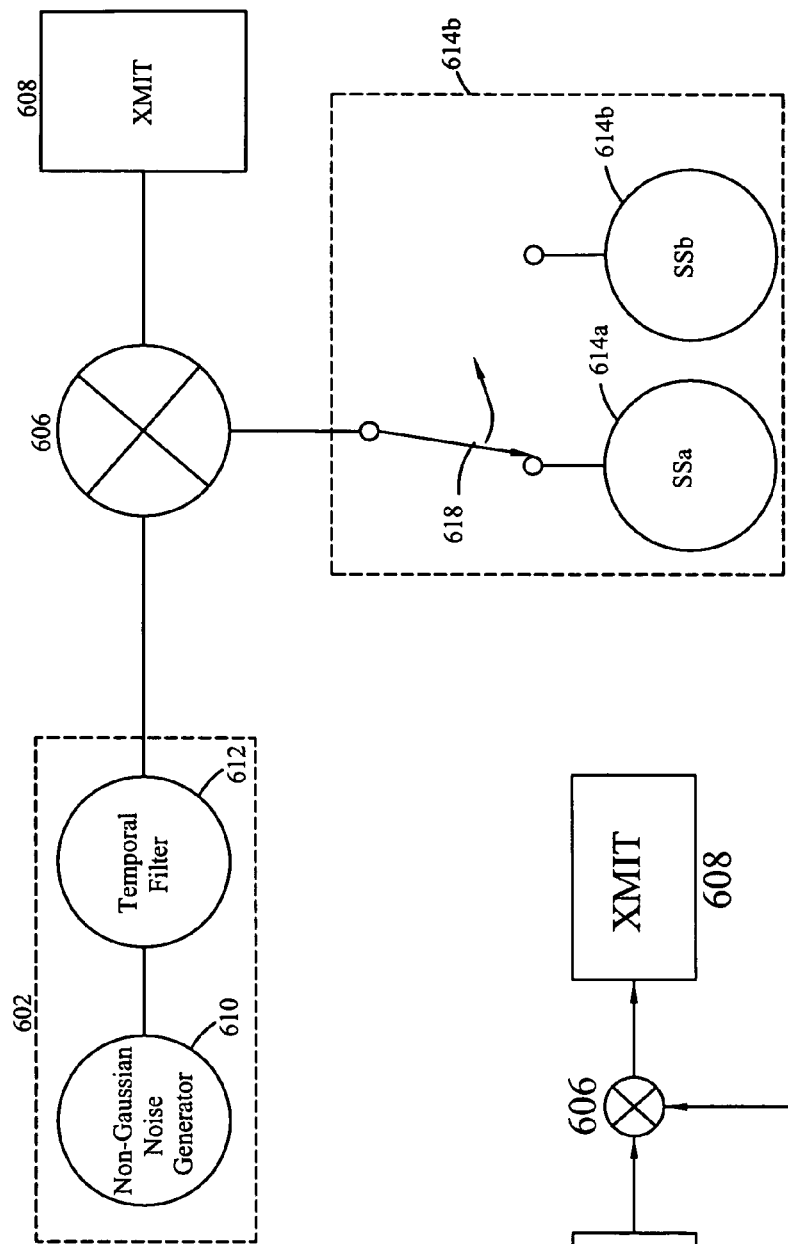
FIG. 6a is a generalized schematic representation of embodiments of the invention.
FIG. 6b is a schematic representation of an embodiment of the invention with dual signal sources.

FIG. 6a is a generalized schematic diagram of an embodiment of a noise signal generator for a waveform independent covert communication system. A noise generator 602 generates temporal dependent non-Gaussian noise. The output of the noise generator 602 is combined by combiner 606 with a carrier signal or waveform source 604. The combiner can be an adder, a mixer, a multiplier, a non-linear device or other type of combiner that facilitate a change in a higher order signal statistic. This list of combiners in not exhaustive and should not be construed to limit the scope of the invention. The combined signal forms a type of baseband signal that is processed (eg. amplified, upconverted, etc.) and transmitted by transmitter 608. The generalized elements in FIG. 6a form a basic framework and facilitates several different embodiment for noise signal generation and transmission of a covert message. The generalized diagram in 6a as well as embodiment shown in FIGS. 6a–6e presented to illustrate variations of noise signal generators and not intended to limit the scope of the disclosure.

FIG. 6b is a specific implementation of FIG. 6a with dual signal sources. The noise generator 602 is implemented with a Non-Gaussian Noise Generator (NGNG) 610 and a temporal filter 612 that creates an output with temporal dependence. The signal source 604 is implemented with two unique signal sources 614a and 614b. Unique signal sources 614a and 614b are selected to create unique spatial high order statistics when combined by the combiner 606 with the output of the noise generator 602. The unique signal sources 614a and 614b are connected to the combiner by a switch 618. The switch is driven by the symbol bit stream of the covert message. The switch 618 connects alternate unique signal sources at the conclusion of each successive symbol duration. It is important to recall that only the time duration of the emitter's statistical characteristic as measured by the SFOCMP is relevant, and not the exact values. Therefore the emitter is completely free to choose the carrier waveforms. While two unique signal sources are shown in FIG. 6b, multiple unique signal source can likewise be applied with the switch alternating between the signal sources.

Figure 6C:
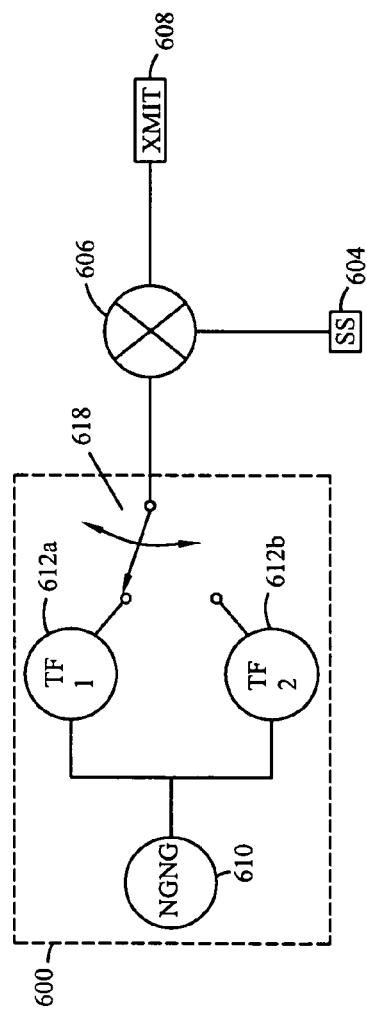
FIG. 6c is a schematic representation of an embodiment of the invention with dual temporal filters.

FIG. 6c is another specific implementation of FIG. 6a having dual temporal filters. The noise generator 602 is implement with a non-Gaussian noise generator 610 connected to two unique temporal filters 612a and 612b. The unique temporal filters 612a and 612b are selected to create unique spatial high order statistics of the transmitted combined signal (e.g. maximum and minimum phase filters). The unique temporal filters 612a and 612b are connected by switch 618 to the combiner 606 and combined with the output of the signal source 604. Again the switch is driven by the symbol bit stream of the covert message in the same manner described above for the dual signal source implementation. The signal or waveform transmitted from transmitter 608 of FIG. 6c provides alternating unique spatial high order statistics for each successive message symbol independent of the symbol transmitter.

Figure 6D:
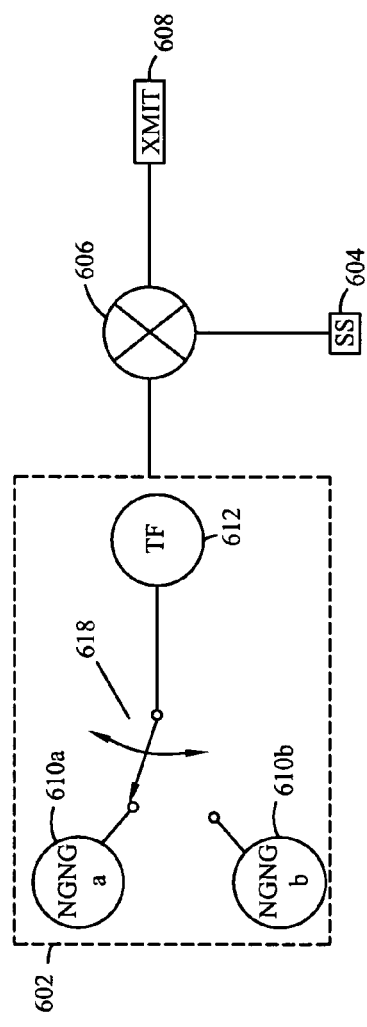
FIG. 6d is a schematic representation of an embodiment of the invention with dual non-Gaussian noise generators.

FIG. 6d is a specific implementation of the noise generator 602 including two unique non Gaussian noise generators 610a and 610b connected by switch 618 to the temporal filter 612. Again the output of the noise generator combined with the signal source 604 in combiner 606 and transmitted by emitter or transmitter 608. The unique NGNGs 610a and 610b are likewise selected for their effect on spatial high order statistic of the transmitter signal.

Figure 6F:
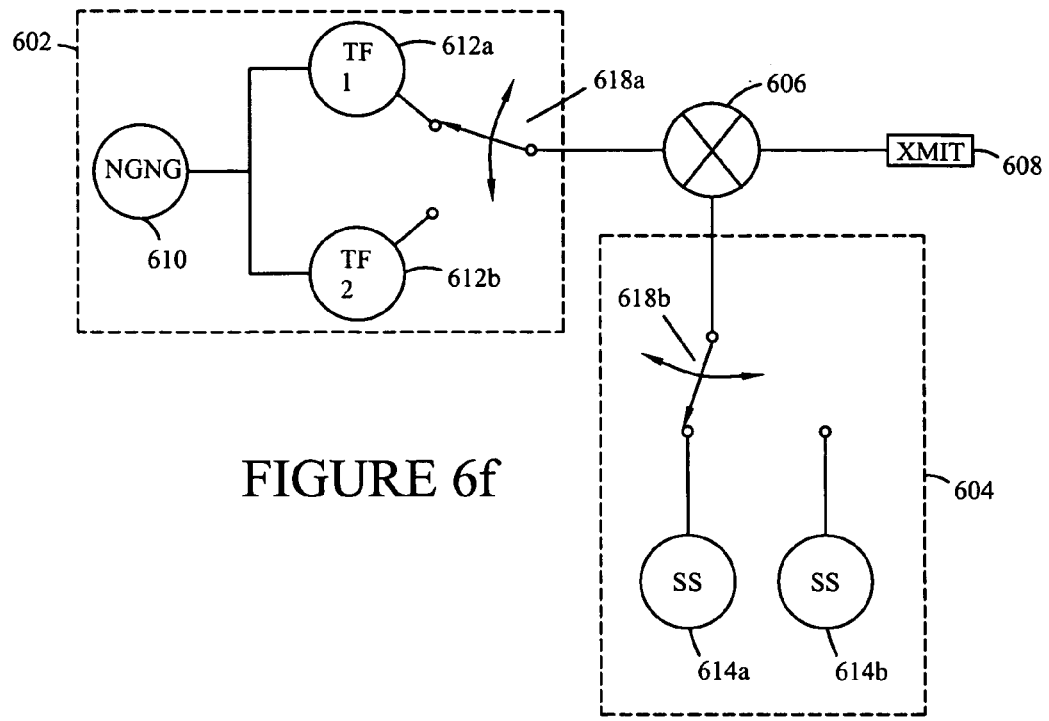
FIG. 6f is a schematic representation of an embodiment of the invention with dual temporal filters and dual signal sources.
Figure 6E:
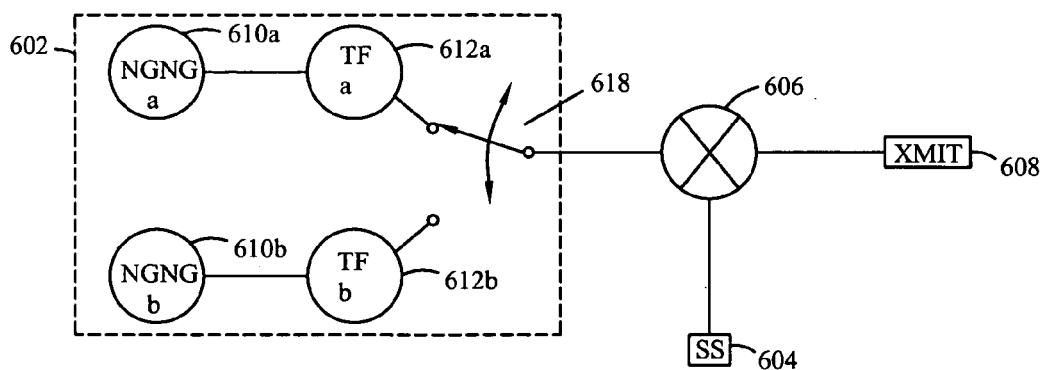
FIG. 6e is a schematic representation of an embodiment of the invention with dual non-Gaussian noise generator and temporal filter branches.

FIG. 6e is an implementation similar to the noise generator 602 of FIG. 6d, where a non-Gaussian noise generator 610a and temporal filter 612a form a unique branch and NGNG 610b and temporal filter 612b form another unique branch. The branches are unique in the sense of their respective spatial high order statistics. The branches are connected to the combiner 606 by switch 618.

Combinations of the specific implementation described and others that should be readily apparent from an understanding of this disclosure are likewise envisioned. FIG. 6f is but one of the many possible combinations. The implementation of the noise generator 602 of FIG. 6f includes the noise generator implementation of FIG. 6d containing two unique NGNGs 610a and 610b coupled with the signal source 604 of FIG. 6b containing two unique signal sources 614a and 614b. While the switches 618a and 618b are constrained to switching at only at the duration boundaries, their operation advantageously would operate independently. The result of this specific implementation allows for switching between four unique signals.

Figure 7:
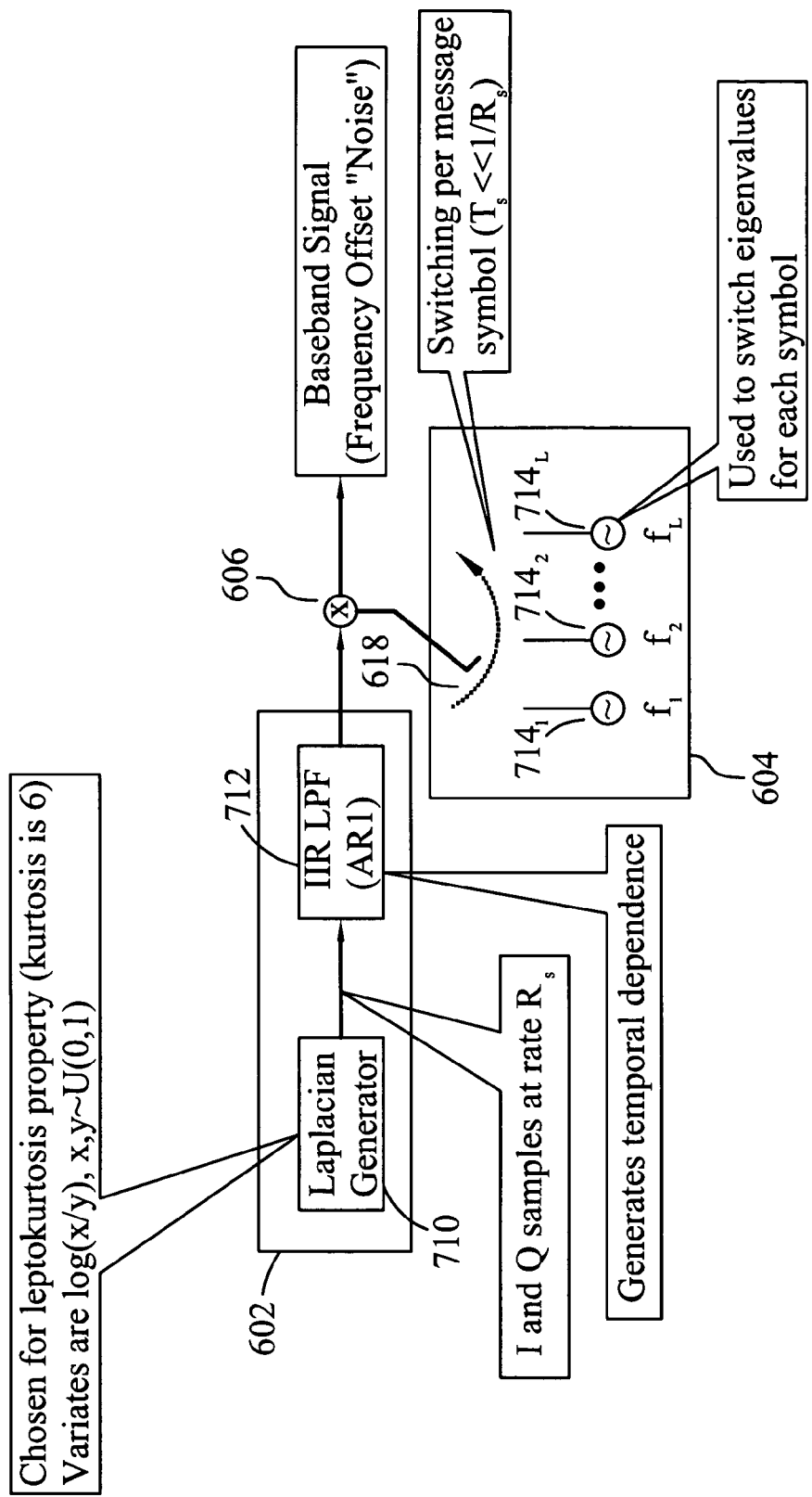
FIG. 7 is a schematic representation of a Laplacian noise generator with multiple signal sources according to an embodiment of the invention.

FIG. 7 is an embodiment using a Laplacian generator 710 and an infinite impulse response low pass filter 712 (e.g. an autoregressive single-pole filter) as the noise generator 602. The Laplacian generator 710 is chosen for leptokurtosis property. We have chosen to form the necessary sequence of random Laplacian variates by selecting a pair of random variants, say x and y, uniformly distributed between 0 and 1 and forming $\log(x/y)$ for each sample required. For complex baseband symbols a total of four uniformly distributed variates must be sampled providing a stream of complex samples where the real and imaginary parts of each are independently Laplacian distributed. The output of the noise generator 602 is combined by combiner 606 with the signal source 604. The signal source 604 is implemented with multiple unique signal sources $714_1, 714_2, \ldots 714_L$ that are used to switch spatial high order statistics (i.e. matrix pencil eignevalues for the present embodiment) for each symbol of the covert messages. The unique signal sources 714 shown are offset in frequency to provide unique matrix pencil eigenvalues. In this particular embodiment, L must be greater than or equal to the alphabet size M.

As shall be understood by those of skill in the art, the specific example discussed above may be extended to use random mappings of frequency offsets over time. Also, we could alter the channel filter. There is no requirement that the filter be IIR as shown in the Figure. A number of alternative implementations could be chosen depending on the application. The key feature of the filter is to introduce a temporal dependence of the input noise waveform. Further one could also consider altering the input noise generator. However, a consideration is to select a source with suitable fourth-order properties. Any or all of these parameters can be modified to control the fourth-order properties for the transmitted waveform so long as the "codebook" constraints (time duration and alphabet size) are maintained. A natural alternative to frequency shifting, would be to pulse the carrier on/off. However, this approach reduces the number of signal samples available for geolocation given a fixed observation interval as discussed hereafter.

If one wished to use standard waveforms as the "carrier waveforms" this mode of operation is also possible with this invention. The transmitter shown in FIG. 7 could be modified to look like alternatives shown in FIGS. 6b–6f. It is also important to notice that any deviations from a nominal waveform type, such as a QPSK waveform without phase noise or timing or I/Q imbalance, will cause a detectable shift in a signal's fourth-order statistic. In principle, the basic waveform need not be altered from QPSK to say BPSK, but uniqueness can be achieve by controlling the parameters of, for example, timing jitter, "carrier waveform" symbol rate, phase noise, pulse shaping and the like to provide the necessary separation in the fourth-order domain or other high order domains. The "carrier waveforms" can contain completely worthless symbols, hence anyone trying to conventionally exploit the "carrier waveform" information would be wasting their time, alternatively the "carrier waveforms" may carry information with a secondary message. However, a secondary message contained within the carrier waveform would not necessarily be LPE, LPI or LPD.

Figure 8:
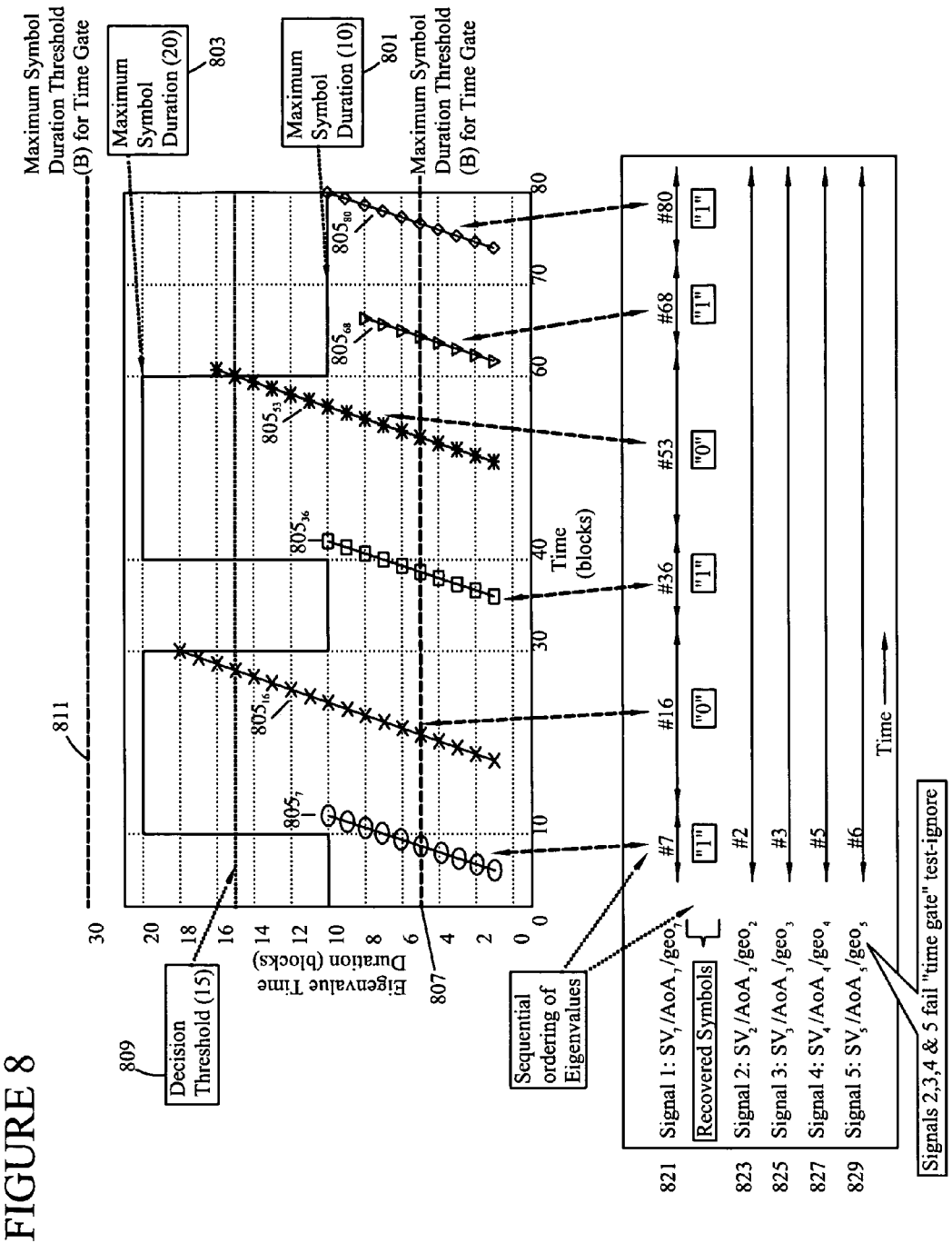
FIG. 8 is a representation of eigenvalue tracks for a frequency shifter laplacian noise waveform for message "101011" according to an embodiment of the invention.

An example of a potential message recovery embodiment is shown in FIG. 8. To recover a message the receiver requires three parameters relative to the time durations of the message symbols. The receiver must know the minimum symbol duration 801, maximum symbol duration 803, and some other information regarding the other M-2 symbols in the alphabet. In the embodiment shown in FIG. 8 only a binary symbol alphabet is used. This information can be provided, say by policy where the symbol duration increments are integer-related to the minimum symbol duration 801. In this case the receiver need only know the maximum duration, the minimum duration and alphabet sizes. Otherwise the receiver can just know a-priori the pre-selected durations which can then be arbitrarily selected. The symbol durations should be selected in an application for easing the decision process in the receiver to map the measured durations to one of the alphabet elements. In this case we used a symbol twice as long as another, but such widely disparate time durations may impact throughput. A minimum symbol duration threshold 807 and a maximum symbol duration threshold 811 can be used as a time gate to remove spurious or interfering tracks. Spatially correlated signal tracks 823, 825, 827 and 829 are examples of eigenvalue durations which exceed the threshold in the time gate and thus are ignored or discarded.

Spatially correlated eigenvalue time durations $805_9$, $805_{16}$, $805_{36}$, $805_{53}$, $805_{68}$ and $805_{80}$ are sequenced in signal track 821. The eigenvalue time duration of signal track 821 are compared to a decision threshold 809 to map and recover the encoded message "101011" of signal track 821. Where a M-ary alphabet is used M-1 decision thresholds are required.

Figure 9:
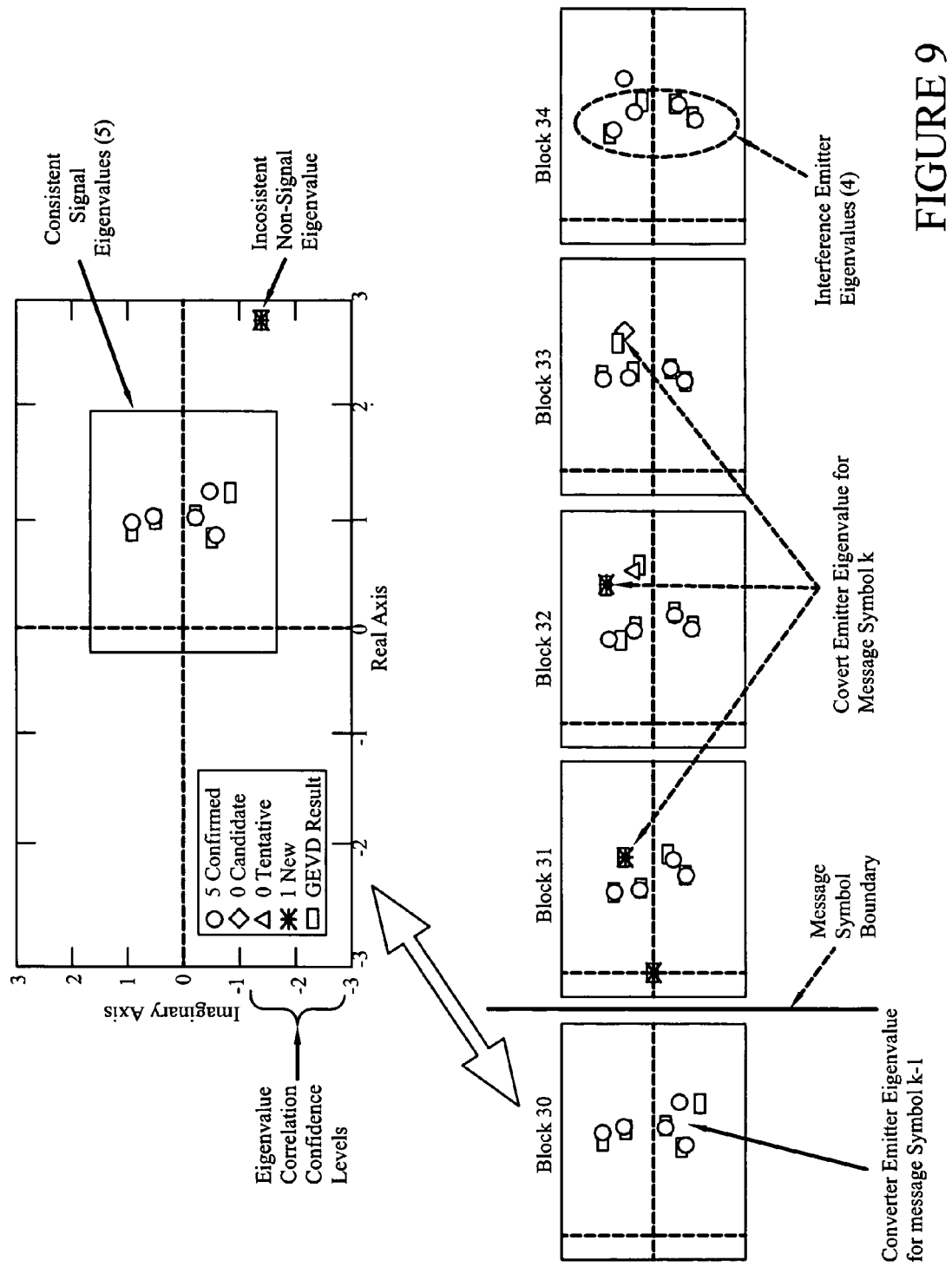
FIG. 9 is a representation of block-to-block eigenvalue correlations.

An illustration of a portion of the block-to-block eigenvalue correlation result is shown in FIG. 9. For block 30 of the covert emitter example in FIG. 4, the large complex plane diagram in the top portion of the FIG. 9 shows the complex eigenvalue locations of the SFOCMP (GEVD) results and the predicted locations of the blockwise eigenvalue correlator. The legend identifies the four levels of eigenvalue correlation confidence, ("New," "Tentative," "Candidate," and "Confirmed"). The five consistent signal eigenvalues of the four co channel interferers and of the covert emitter are indicated by the smaller rectangle. The inconsistent non-signal eigenvalue outside this box tends to move about the complex plane in an erratic/unstable fashion from one block to the next. In this block 30 of this example, the covert emitter eigenvalue lies below the imaginary axis. Blocks 30 and 31 correspond to two different symbols. The lower portion of FIG. 9 illustrates the blockwise changes in eigenvalue locations over blocks 30 to 34 where the message symbol "boundary" occurs between blocks 30 and 31. For blocks 31 to 34, the covert emitter eigenvalue lies in a consistent location above the imaginary axis of the complex plane. The stronger co channel interference source eigenvalues, within the oval for block 34, lie in consistent locations over all five blocks. In a case involving pulsed interference emitters, the consistency of the spatial locations of the interference emitters and covert emitter allow message recovery embodiment to "stitch" together eigenvalues that fall within a "time-gate" and come from the same spatial location.

As mentioned above, using a simple time-gating operation in the receiver, it is possible to determine which eigenvalues are potentially information carrying. By correlating the GEVD over many blocks of data the persistence of the eigenvalues can be measured. The persistence of eigenvalues of the SFOCMP over time from the covert transmitter provides the signaling mechanism. However, there may be a number of extraneous pulsed signals in the FOV time coincident with the desired communication signal. This makes message recovery complicated, though with proper message construction and error recovery/correction (i.e. FEC), the system is robust to several types of errors such as "erasures" when ambiguous results may be obtained in the decoding and symbol recovery errors. These results can be encountered due to signal fades (i.e. erasures) or symbol recovery errors in the receiver due to statistical fluctuations in time duration measurements exceeding a tolerable threshold. We can correct improper decisions regarding the detection of a symbol in the message in the receiver using typical error control coding.

Figure 10:
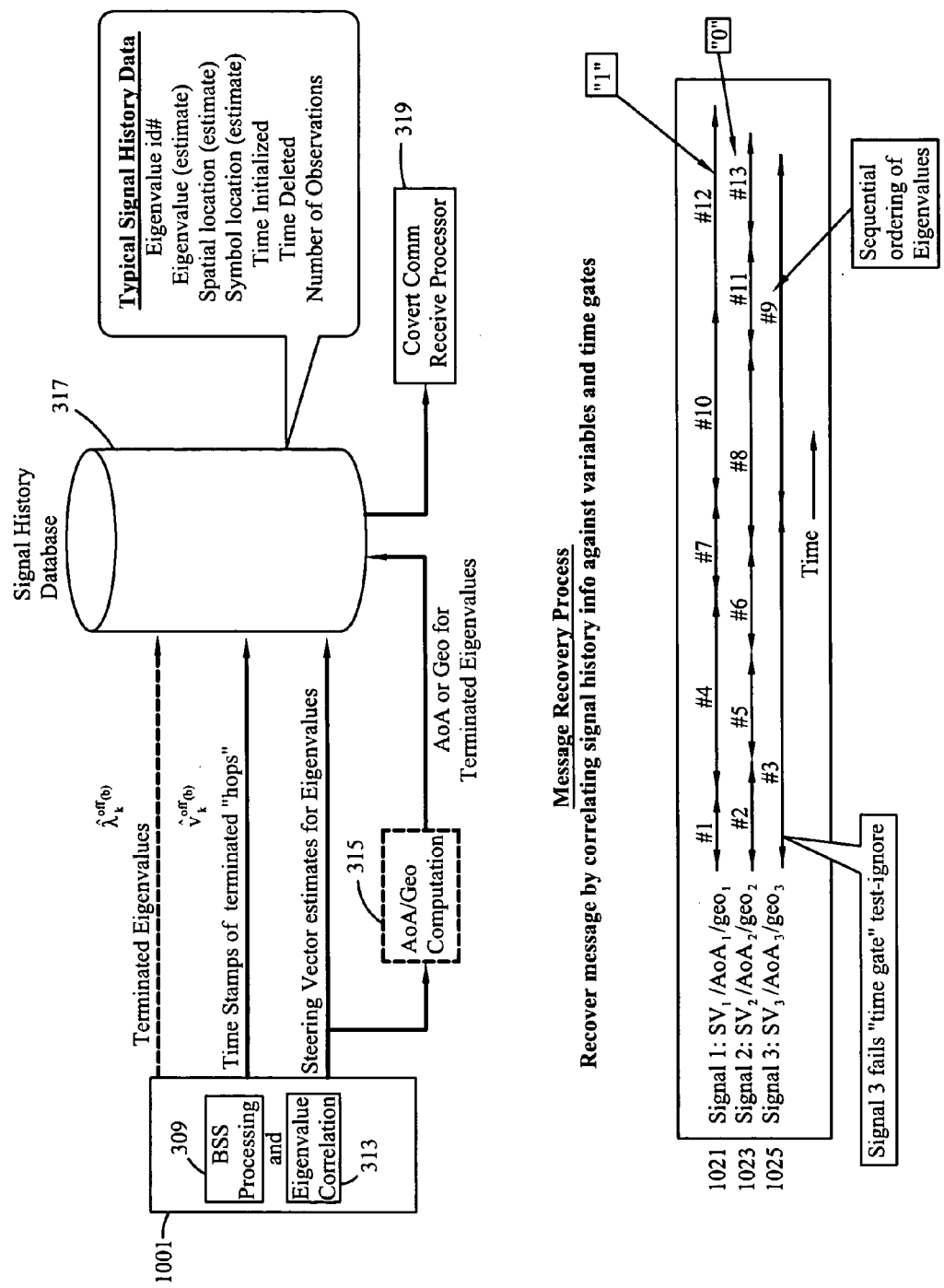
FIG. 10 is a schematic representation of a message recovery system with spatial information according to an embodiment of the invention.

An embodiment of the receiver 303 is shown in FIG. 10. The receiver 303 augments the message recovery process by using spatial information regarding the locations of the transmitters in the field of view. In FIG. 10 signal detections are performed in processor 1001 which is composed of a BSS processor 309 and (eigenvalue) tracking processor 313 previously described. The results of the blockwise processing and eigenvalue correlation previously described are stored in the Signal History Database 317. The data envisioned for the database are signal characteristics measured which include but are not limited to eigenvalue identification number, time initialized, time deleted, number of observations, an estimate of the eigenvalue, and importantly an estimate of the spatial location associated with the eigenvalue. To recover the message in the communication receive processor 319, it is advantageous to initially time gate (filter) all the detections (i.e. durations of the eigenvalues) to limit the scope of the message recovery process. The detections surviving the time gate test are stored in the signal history database 317 along with other associated eigenvalue characteristics, including but not limited to Signal track identification, Symbol estimate, Time initialized, time deleted, number of observations and importantly spatial location. The detections are assembled into strings of symbols (tracks) using the criteria that a message must associate with a "consistent" spatial location. The preferred spatial information is angle-of-arrival (AoA) or geolocation for each signal detected in each block which are determined in the AoA/Geo computation processor 315. This requires that the receiver platform have knowledge of the N-port sensor array calibration and the platform position during receipt of the covert message, such knowledge would normally be available. For simplicity of presentation, from hereon the term "spatial location" or spatial variable refers to AoA if only calibration is known, or geolocation if both receiver position and array calibration are known. It is preferable that the spatial relationship between the transmitter 302 and receive array 327 be fixed over the message length, however, a slowly varying spatial property can be accommodated by introducing a method to correlate a sequence of spatial variables across contiguous blocks of data in the receiver 303 specifically in the Message Sequence Correlator 323 of the Covert Communication Processor 319.

Spatial correlation can be broaden to include simply steering vectors. This is useful when the array and transmitter have a stable geometry. Relative motion between the transmitter and sensing array causes the steering vectors to have a detrimental time dependency. Again, if the spatial variable for correlating the message data is "slowly" varying then small incremental changes can be tolerated. The covert messages is indented to be recovered using a "consistency" of the spatial domain information of the computed eigenstructure from the SFOCMP for the signals of interest. But to account for the possibility of "fixed" location emitters and other emitter who are not of interest to the communication process, a time-gate decision process as noted earlier is advantageously applied. This way the receiver need only attempt to decode "message strings" that emanate from "consistent" spatial locations with the appropriate time character.

Although access to the spatial variables using only the receive array output data has been previously described. It is useful to note a blind source separation algorithm based on a fourth-order cumulant matrix pencil produces eigenvectors that are orthogonal all but one signal's steering vector. Thus using the eigenvectors it is possible to estimate each corresponding signal's steering vector. Two methods are possible. The first method is to use the blockwise estimates directly available from the BSS process as described in relation to FIG. 3 such as averaging across the blocks. A second method is to use the time stamps available from the blockwise correlation process 313 of particular eigenvalues as indexes into the digitizer buffer memory. Subsequently, the raw data so indexed is used to directly make an estimate of the steering vector. In both cases the steering vector will be estimated using the data available from the GEVD of the SFOCMP. Once steering vector estimates are available, the estimation of the other spatial variables, AoA and/or geolocation, can be determine by methods well-known in the art. The characteristic that allows this computation is that the eigenvalues and eigenvectors of the GEVD of the SFOCMP have a 1:1 correspondence as in standard eigenanalysis. So, when the eigenvalues are used to measure the high-order statistical properties of the received signals, an index relating directly to where that signal with that characteristic emanated from is available. Again, the spatial dimension for signal association can be exploited to remove any ambiguity of the temporal decomposition, since we assume that no two emitters are identically located.

Signal tracks 1021, 1023 and 1025 containing associating matrix pencil eigenvalues from consistent sources as evident from common spatial variables are used to recover the message by correlating track information against spatial variables and time gates. This recovery process in performed by the covert communication receive processor 319.

The recovered messages are composed of sequentially ordered matrix pencil eigenvalues with a duration within the time gate originating from the same location as determined by the steering vector estimate, AoA or geolocation. The "signal sequence 1" 1021 includes eigenvalues 1, 4, 7, 10, and 12 with durations mapping message "01011", these eigenvalues and their associated signals all originated from a "consistent" spatial location, namely, $Geo_1$, $AoA_1$ or had the same steering vector $SV_1$. Similarly, "signal sequence 2" 1023 includes eigenvalues and durations with common steering vectors, AoA, or geolocation and the durations pass the time gate filter thus recovering a "000100" message. "Signal sequence 3" 1025 however had two eigenvalues 3 and 9 with high spatial correlation, however the signal is not decoded since the durations exceed the time gate allowable. In short, the receive processor recognized that the time durations in sequence 1025 do not correspond to any symbols of the expected alphabet.

The advantages of incorporating spatial variables into the message recovery process warrant explanation. First, the spatial variables aid in rejecting extraneous pulsed emitters based on their spatial locations being anti-correlated over time to the persistent spatial locations of the covert emitter(s). By the same token, spatial variables allow the basic signaling approach to support multiple access of covert emitters without undue burden in the receiver for properly assembling the pulsed message sequences. This is because the additional covert emitters will very likely emanate from resolvable spatial locations, and the receiver can use the consistency of the spatial locations over time to associate the proper message sequence. For each transmitted signal, the message sequence is represented by the time durations of the eigenvalues of the appropriately selected matrix pencil, where we have preferred the SFOCMP approach.

The spatial location of any emitter is independent of the exact value of its corresponding eigenvalues available from the GEVD of the SFOCMP. Lastly, the spatial variables provide additional "distance" in the recovery process, since it is now multi-dimensional. For example, two signals may have very similar eigenvalues. But, if their spatial locations are resolvable by the receiver, and fairly constant, then the eigenvalues corresponding to those spatial locations can be easily assigned. Then the message can be recovered using the time duration of each eigenvalue in the sequence assigned a given spatial location using the same technique as previously described when only a single covert signal was in view.

The ability to resolve spatial location has system implications that are interrelated. Some top-level practical design issues that must be reconciled are desired proximity of transmitters, expected noise environment, block processing sample support for estimating spatial locations and the eigenvalues available from the SFOCMP, digitizer sample rates, signal bandwidths and center frequencies, aperture design (i.e. element type, size, number of ports, operating frequency), and the like. This is of course in addition to having an appropriate level of calibration and positional knowledge of the receive platform. Many of these considerations are direct carry-overs from standard array-based signal processing systems.

Figure 11:
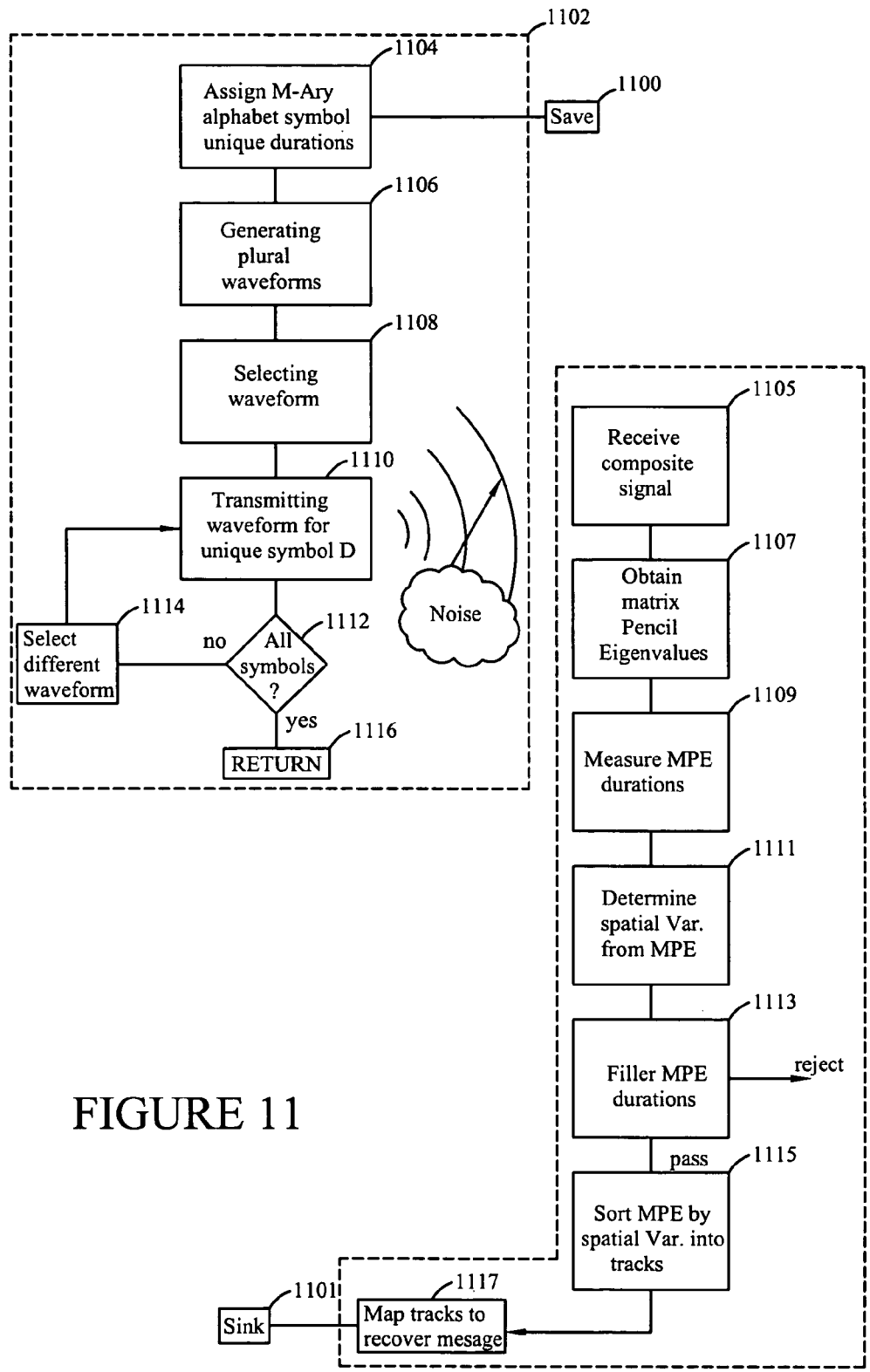
FIG. 11 is a flow diagram for covert communication via message recovery with spatial information according to an embodiment of the invention.

FIG. 11 is a flow chart for covert communication with a transmitter 1102 and a receiver 1103 using message recovery with spatial information as shown in FIG. 10. The source 1100 provides a data stream to the covert transmitter 1102 as a stream of M-ary alphabet symbols. In block 1104 each M-ary alphabet symbol is assigned a unique duration. Plural waveforms with determinable high order statistic that are constant and non zero are generated in block 1106. One of the plural waveforms is selected in block 1108 and is transmitted for the symbol assigned duration in block 1110. In block 1112 it is determined if the transmitted symbol is the last in the message, if the last symbol has be transmitted the process is returned in block 1116 to standby or other quasi active state pending initiation of a new message. If other symbols remain to be transmitted, a different waveform from that previously transmitted is selected in block 1114 and transmitted for the respective symbols assigned duration in block 1110.

The receiver 1103 receives the transmitted waveform along with environmental and random noise in a multi element array as shown in block 1105. Using BSS and GEVD, matrix pencil eigenvalues (MPE) are obtained in block 1107 and the MPE are blockwise correlated to determine their respective durations in block 1109. A spatial variable or location is determined from the MPE in block 1111, again the spatial variable can be selected from a Steering vector, AoA or geolocation. The MPE detection durations are time gate filtered in block 1113 to reject detections outside of the duration minimum and maximum thresholds. The passed MPE and durations are sequentially sorted by common or consistent spatial variable in to signal tracks in block 1115. The signal tracks are maps are mapped (i.e. their durations are correlated to symbols and their respective assigned durations) to recover the message in block 1117. The message may be processed otherwise transformed to provide the message at the sink 1101.

If spatial data is unavailable, say because calibration of the sensing array has been degraded, the communication process can still operate. However, the freedom of waveform selection by the transmitter is reduced. In this case the transmitter must select a specific waveform type and use it exclusively (in a pulsed fashion) over the entire message (FIG. 4). Unfortunately with this implementation option the achievable data rate is reduced because of the need to introduce "deadtime" to define symbol boundaries. Thus it is possible to use a single "carrier waveform" that can be pulsed "ON" for each symbol followed by a period of "OFF" time. In this way the covert transmitter need only use a single waveform and need not modify it's fourth-order cumulant signature. This could be an advantage in systems where additional spatial correlation variables preferred to aid unambiguous assignment of the received eigenvalues are unavailable, since we identify one and only one eigenvalue. But as mentioned this is disadvantageous in a multi-emitter environment. For such an environment we prefer a waveform agile emitter where the "carrier waveform" sequencer logic can be designed to select the "carrier waveform" for a specific duration, controlled by the message symbol, in either a fixed map or in some other manner. The mapping choice would be up to the transmitter designer and need not be known to the receiver. The receiver processing is shown in FIG. 12.

Figure 12:
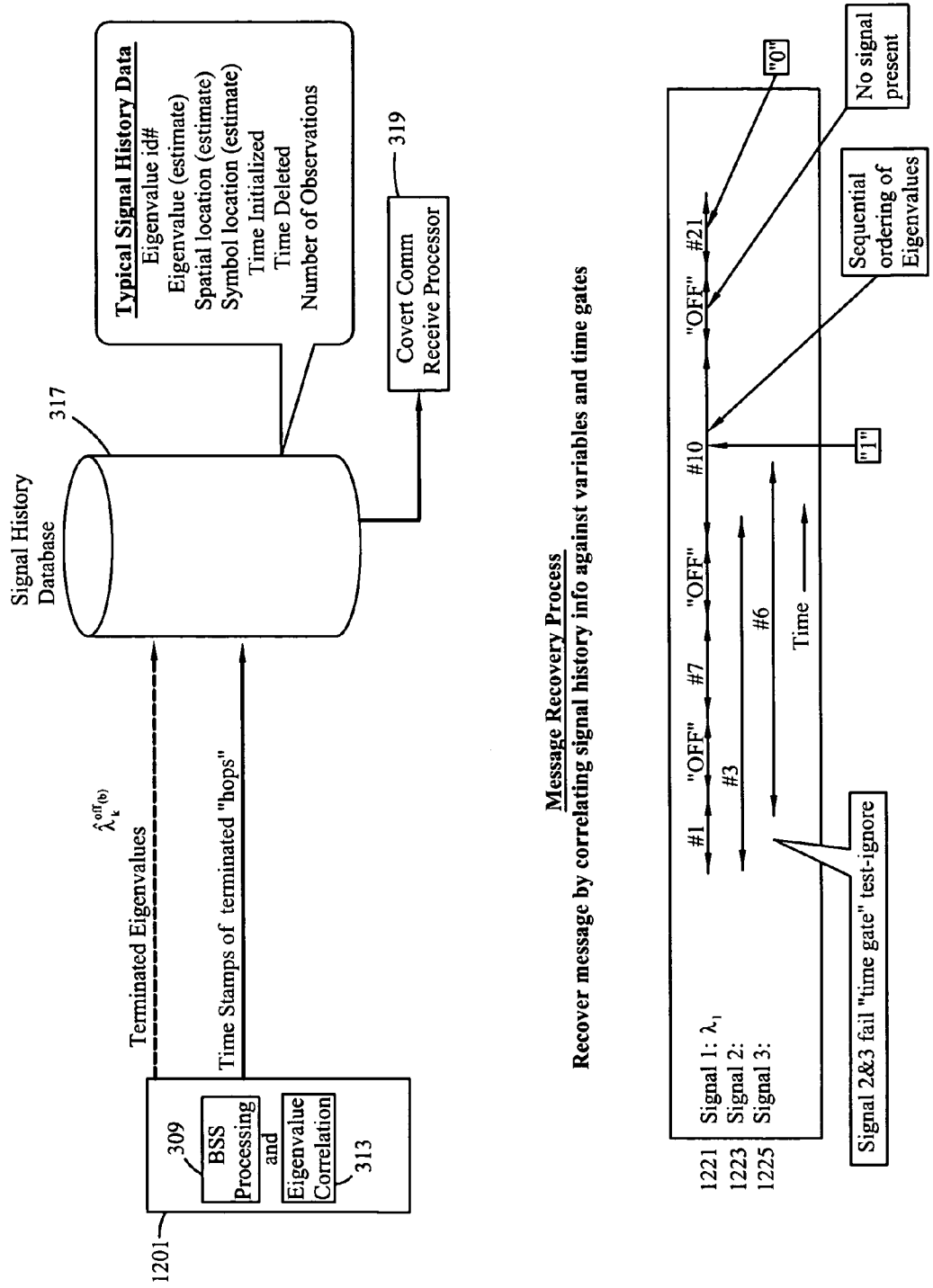
FIG. 12 is a schematic representation of a message recovery system without spatial information according to an embodiment of the invention.

FIG. 12 presents a receiver 303 for processing covert messages without spatial location or spatial variable information. Processor 1201 contains BSS processing 309 and eigenvalue correlation 313 operating in the same manner as previously described, however without transferring or developing spatial variables. Therefore the eigenvalue characteristic and time stamps for determining eigenvalue duration are stored in the signal history database 317, without a spatial variable. For the embodiment of FIG. 12, the tracks are not sorted by spatial location by rather eigenvalues. Signal tracks contain only detections of the same eigenvalue with a detected duration that passes the time gate. Signal 1221 includes only one eigenvalue with 4 detection durations that pass the time gate. Signal 1221 thus is mapped to recover message "0010". The durations of the "OFF" period of pulse is irrelevant as long as its duration is greater that 1 block to enable the previous detection to be terminated the tracking correlator 313. Signal tracks 1223 and 1225 are both ignored or discarded for failing the time gate.

Figure 13:
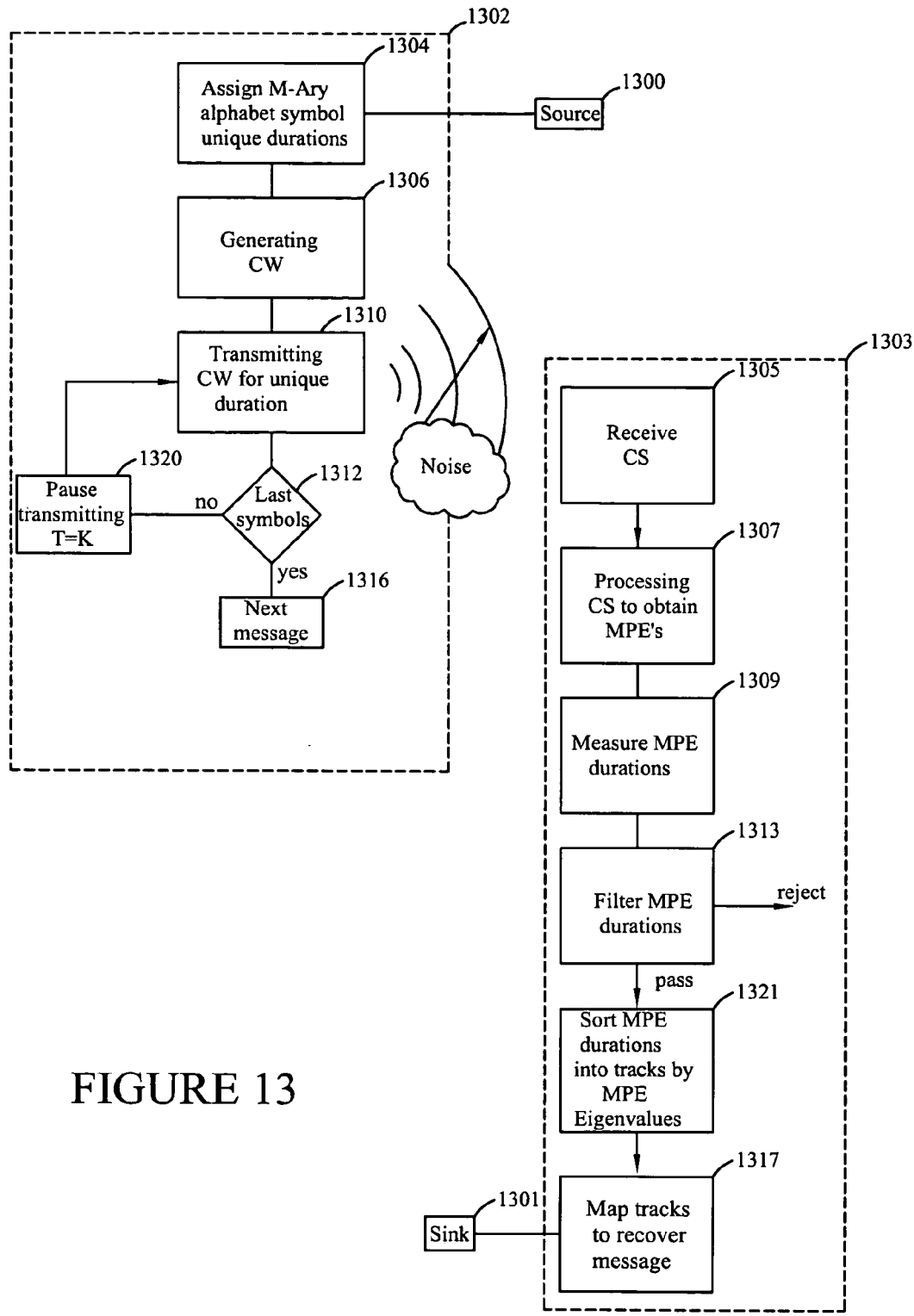
FIG. 13 is a flow diagram for covert communication via message recovery without spatial information according to an embodiment of the invention.

FIG. 13 is a flow chart for covert communication with a transmitter 1302 and a receiver 1303 using message recovery without spatial information as shown in FIG. 12. The process is similar to that shown in FIG. 11. The source 1300 provides a data stream to the covert transmitter 1302 as a M-ary alphabet symbols. In block 1304 each M-ary alphabet symbol is assigned a unique duration. However, now a signal waveform with a determinable high order statistic that is constant and nonzero is generated in block 1306. The waveform is transmitted for the symbol assigned duration in block 1310. In block 1312 it is determined if the transmitted symbol is the last in the message, if the last symbol has been transmitted the process is returned in block 1316 to standby or other quasi active state pending initiation of a new message. If other symbols remain to be transmitted, the transmitter is paused, or another unique waveform is transmitter for an small duration t=k in block 1320. The waveform generated in block 1306 is again transmitted for the respective symbol assigned duration in block 1310.

The receiver 1303 receives the transmitted waveform along with environmental and random noise in a multi element array as shown in block 1305. Using BSS and GEVD, matrix pencil eigenvalues are obtained in block 1307 and the MPE are tracked to determine their respective durations in block 1309. The MPE detection durations are time gate filtered in block 1313 to reject detections outside of the duration minimum and maximum thresholds. The passed MPE and durations are sequentially sorted by specific eigenvalue into signal tracks in block 1321. The eigenvalue durations forming the "signal sequences" are mapped (i.e., their durations are correlated to symbols and their respective assigned durations) to recover the message in block 1317 and delivered to the sink 1301.

Figure 14:
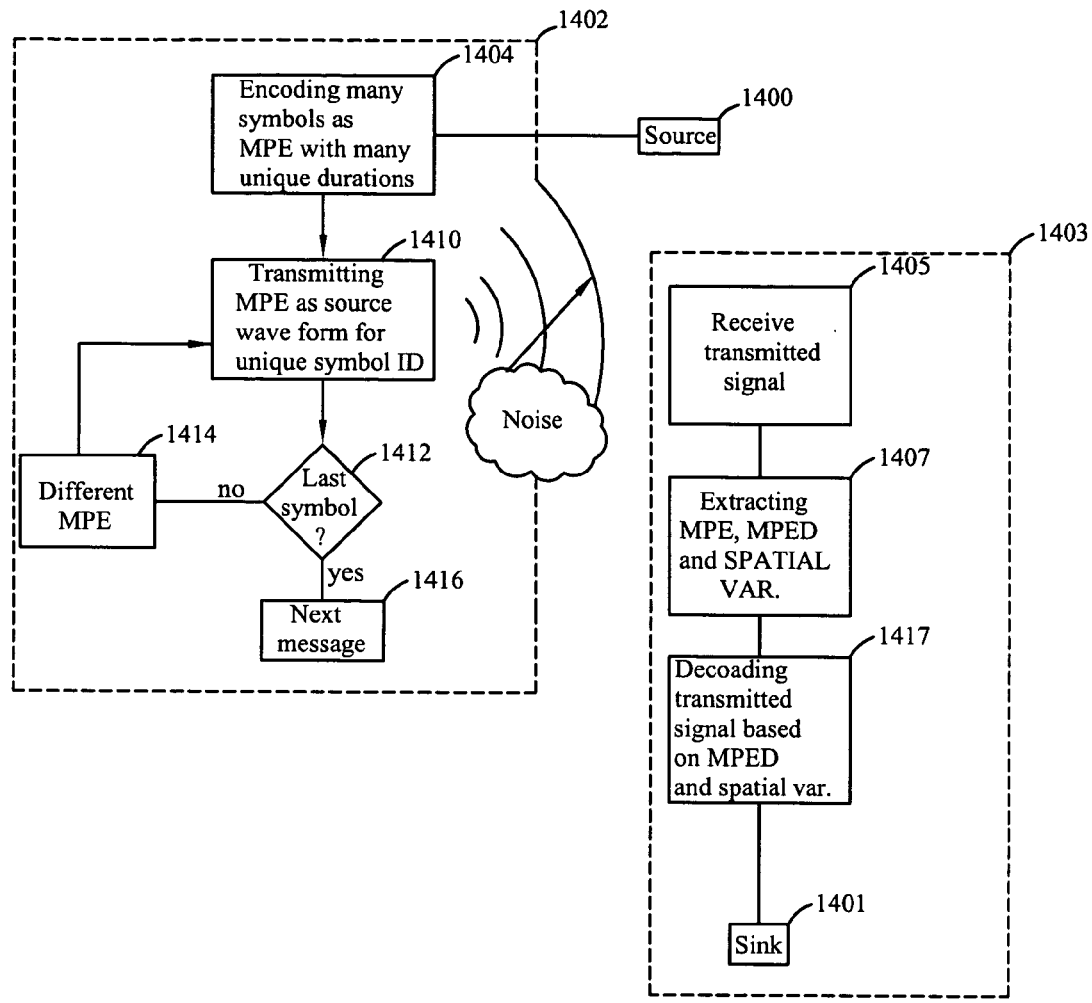
FIG. 14 is a flow diagram for covert communication via encoded eigenvalues according to an embodiment of the invention.

FIG. 14 is a flow diagram for covert communication using encoded eigenvalues and spatial information. The source 1400 provides a data stream to the covert transmitter 1402 as a M-ary alphabet symbols. In block 1404 the M-ary symbols of the messages are encoded as MPE with unique durations. The eigenvalue is transmitted for the symbol assigned duration as a respective source waveform in block 1410. The source waveform is the low order signal whose high order statistic creates the respective eigenvalue. In block 1412 it is determined if the transmitted symbol is the last in the message, if the last symbol has be transmitted the process is returned in block 1416 to standby or other quasi active state pending initiation of a new message. If other symbols remain to be transmitted, a different MPE is selected in block 1414 and transmitted with a respective symbol assigned duration as a respective source waveform in block 1410.

The receiver 1403 receives the transmitted waveform along with environmental and random noise in a multi element array as shown in block 1405. Using BSS and GEVD, the matrix pencil eigenvalues encoding the symbol are recovered and tracked in block 1407 to determine their respective durations and spatial information in block 1409.

The MPEs are decoded based on MPED and Spatial information as previously described in block 1417 to recover the message and provide the message symbols to the sink in block 1401. Generally the noise is white Gaussian noise, color noise or interferer signals.

Figure 15:
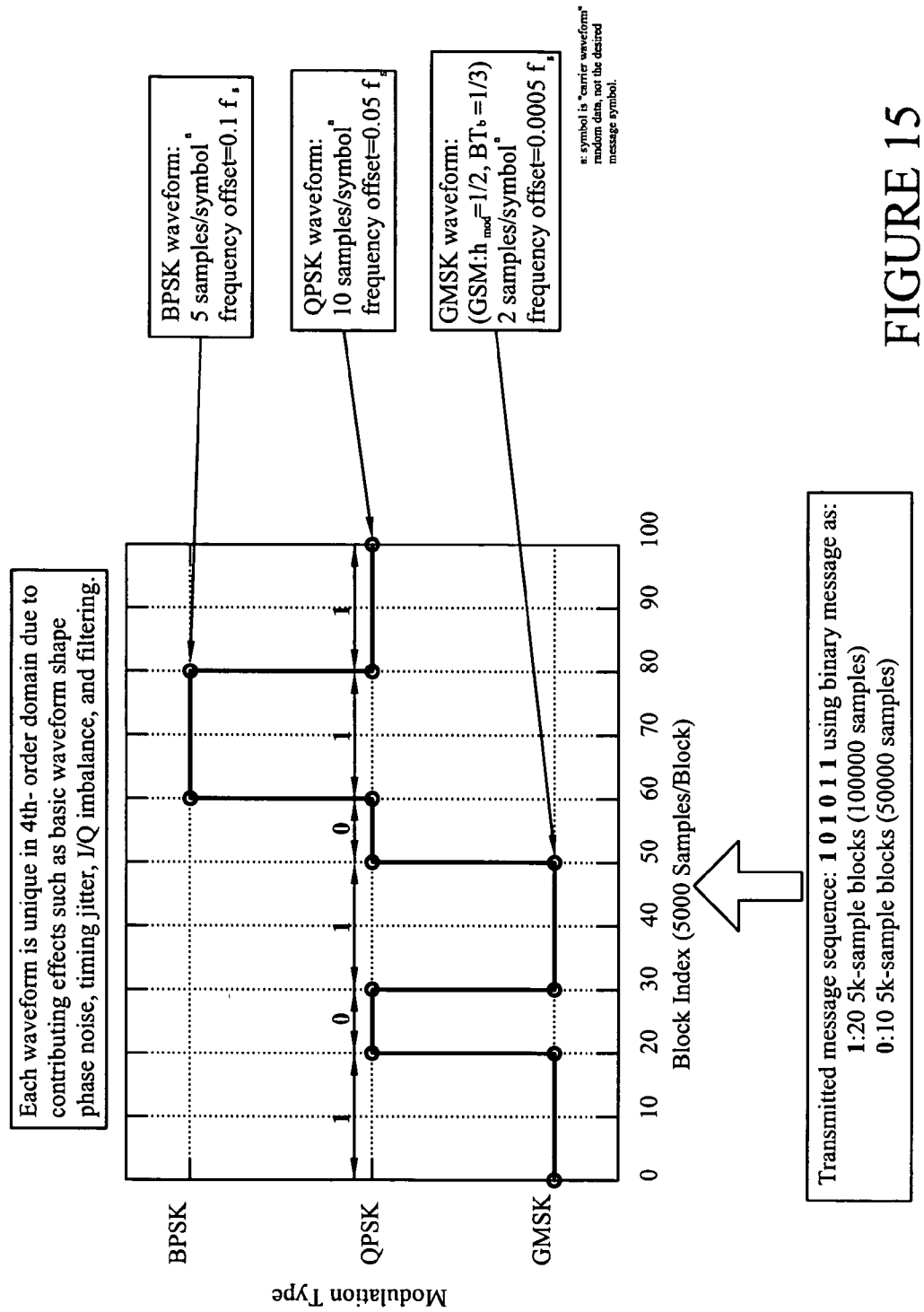
FIG. 15 is a representation of a binary message sequence 101011 encoded using different carrier waveforms.

FIG. 15 is a representation of a binary message sequence 101011 transmitted via data carrying waveforms according to an embodiment. In the embodiment shown the symbol are transmitted by alternating waveforms of BPSK, QPSK and GMSK. As the message is independent of the encoded data, for LPI it is preferred that the carrier waveforms be modulated with random data at a rate greatly exceeding the covert message symbol rate. The random data may be modulated for a BPSK waveform at 5 sample/per random symbol with a frequency offset of 0.1 $f_s$, for QPSK wave at 10 samples/random symbol with a frequency offset of $-0.05$ $f_s$ and for a GMSK waveform (GSM:$h_{mod}$=1/2, $Bt_b$=1/3) 2 samples/random symbol with a frequency offset of 0.0005 $f_s$. Other waveforms including to DQPSK, DBPSK, FSK, QAM, DPCM are equally applicable and are also envisioned, however embodiments of the invention should not be construed to be limited to the particular waveforms listed.

As discussed previously the waveform duration discriminates the message symbol. As shown in FIG. 15 the symbol 1 has a duration of 20 blocks and the symbol "0" has a duration of 10 blocks. The message is transmitted as a GMSK waveform for a duration of 20 blocks indicating a symbol "1". The next symbol is transmitted as a different waveform QPSK for a duration of 10 block indicating a symbol "0". The next symbol is transmitted by the GMSK waveform for a duration of 20 blocks again indicating a "1" symbol and a QPSK waveform is used to transmit the "0" symbol. As illustrative of the independent of the waveform and message content the symbol "1" is then transmitted as a BPSK waveform for a 20 block duration and the next symbol "1" is transmitted by the QPSK waveform for a duration of 20 block. Evident in FIG. 15 is that identical waveforms can communicate different symbols while maintaining waveform content and message independence.

Figure 16:
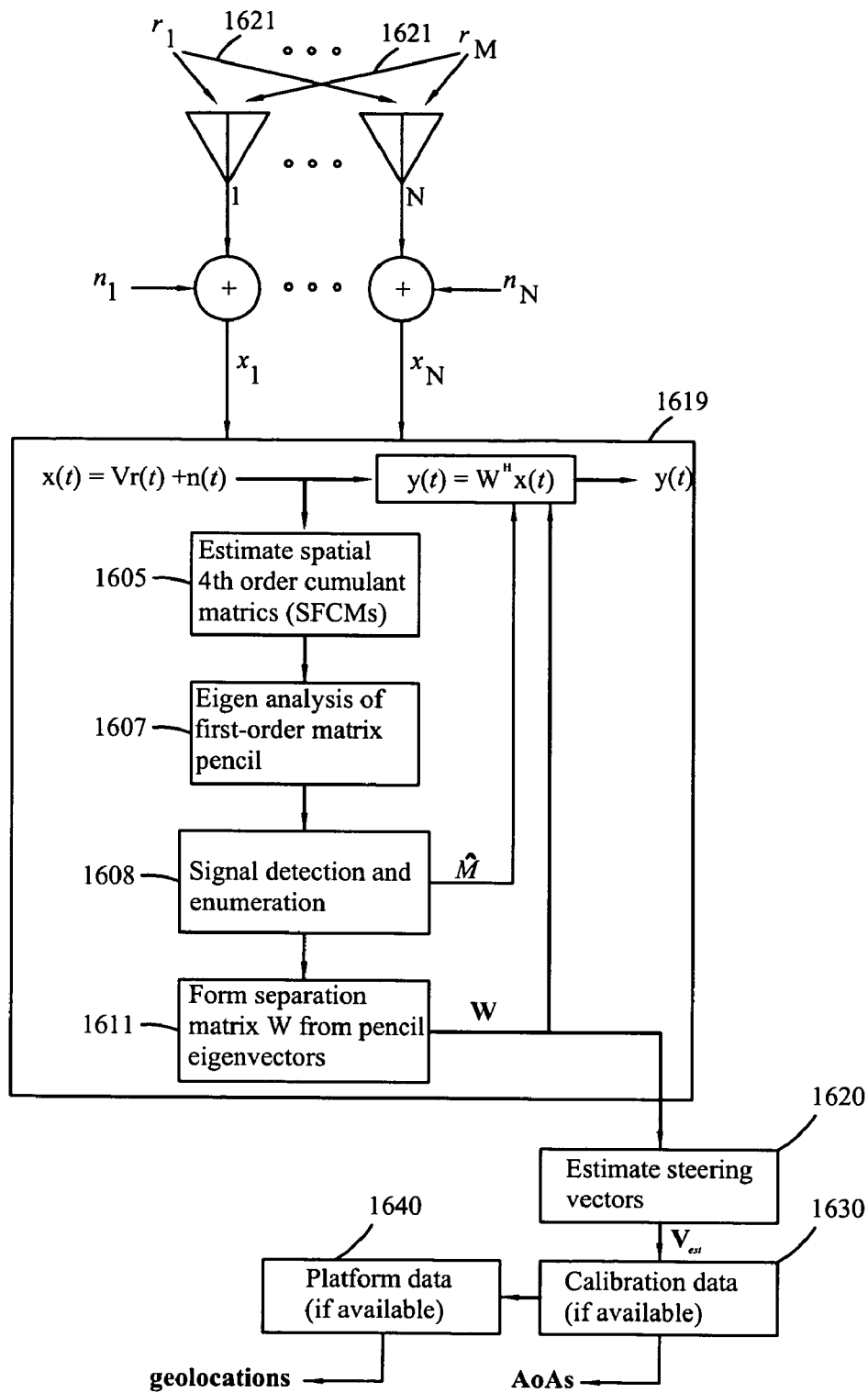
FIG. 16 is a representative diagram for geo-locating a transmitter using higher order cumulants.

The use of the higher-order statistics can be used to geolocate a transmitter. FIG. 16 is a embodiment of a system for geolocation 1600. A receiver 1609 with a multi-element sensor array or antenna array receives the transmitted signal(s) 1621 from the target transmitter(s) 1624. The receiver 1609 contains processors, microprocessor and/or logic circuits implemented with hardware and/or software to estimate a spatial $4^{th}$ order cummulant matrix 1605, perform eigen analysis of the first order matrix pencil 1607, perform signal detection and enumeration 1608 and form the separation matrix 1611. The steering vectors are then estimated using the non-orthogonal eigenvectors with a 1:1 mapping of the eigenvalues obtained with the GEVD of the matrix pencil as shown in block 1620. Using calibration data of the multi-element sensor array the AoA of the detected signal(s) from the transmitter(s) in 1630. The AoA coupled with the position of the platform (multi-element sensor array) enables geolocation of the target transmitter(s) shown as block 1650. The determination of geolocation from AoA and positional data can be achieved from many known methods.

The subject matter regarding geolocation an also be used to "track" a mobile convert emitter, or a mobile emitter with a distinct and fixed temporal structure or characteristic (i.e. a chain of eigenvalues) known to the receiver. The receiver uses GEVD indexed by the eigenvalues to compute and associate a sequence of AoAs and geolocations. A receiver with the a-priori knowledge of the temporal structure can associate a sequence eigenvectors with correlated temporal characteristic and applying kinematics constraints (i.e. maximum velocity and/or maximum acceleration for the emitter), construct a path history or prediction for the emitter.

Figure 17:
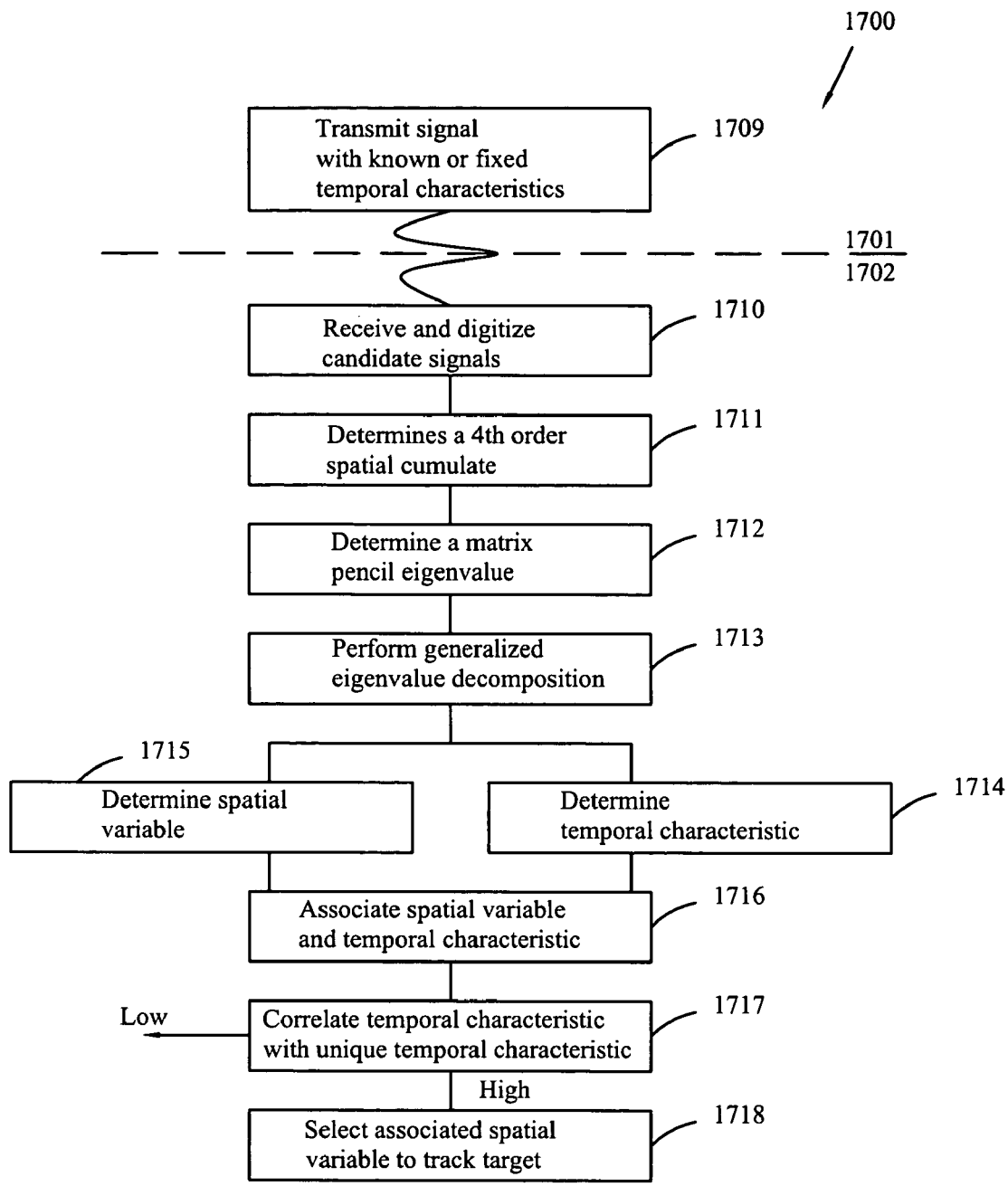
FIG. 17 is a flow diagram for tracking a cooperative transmitter.

FIG. 17 is a flow chart for tracking a cooperative or known emitter. The target emitter 1701 whether cooperative or non-cooperative transmits a signal with a known, fixed temporal characteristic in block 1709. The receiver 1702 receives the transmitted signal and other unknown signals collectively candidates signals with a multi-element sensor array, digitizes the output of the array for each of the candidate signals in block 1710. The blind source selection process discussed earlier is performed on the candidate signals, including determining a spatial $4^{th}$ order cummulant 1711, determining a matrix pencil eigenvalue 1712 and performing generalized eigenvalue decomposition 1713.

From the generalized eigenvalue decomposition 1713 a spatial variable is determined in block 1715. A non-orthogonal eigenvector corresponding to the steering vector of the candidate signal is selected as the spatial variable. The receiver also determines a temporal characteristic of the candidate signals in block 1714. The spatial variable and the temporal characteristics of the candidate signal are associated in block 1716 and the temporal characteristics are correlated, or compared to the unique known temporal characteristic of the signal transmitted from the target transmitter in block 1717. The spatial variable associated with the temporal characteristics that are highly correlated with the temporal characteristics of the target transmitters signal are selected in block 1718. These selected spatial variables like AoA or geolocation can be used to track the target transmitter.

While preferred embodiments of the present inventive system and method have been described, it is to be understood that the embodiments described are illustrative only and that the scope of the embodiments of the present inventive system and method is to be defined solely by the appended claims when accorded a full range of equivalence, many variations and modifications naturally occurring to those of skill in the art from a perusal hereof.

We claim:

1. A system for locating a transmitter, where said system is geographically separated from the transmitter, said system comprising:
    receiving means for receiving and digitizing a signal emitted by the transmitter to thereby produce a received signal;
    means for determining a matrix pencil eigenvalue for at least a portion of said received signal;
    means for determining the generalized eigenvalue decomposition of said matrix pencil eigenvalue;
    means for determining a spatial variable of the matrix pencil eigenvalue from the generalized eigenvalue decomposition; and,
    means for determining the location of the transmitter from the spatial variable to thereby locate the transmitter.

2. The system of claim 1 wherein said spatial variable is a steering vector.

3. The system of claim 2 further comprising means for determining the angle of arrival of the transmitted signal as a function of said steering vector.

4. The system of claim 3 further comprising means for determining the geolocation of said transmitter as a function of said steering vector.

5. The system of claim 1 wherein the signal has a received SNR less than 0 dB.

6. The system of claim 1 wherein the signal has a SNIR less than 0 dB at the receiver.

7. The system of claim 1 wherein the signal has a SNIR less than −6 dB at the receiver.

8. The system of claim 1 wherein the means for determining the matrix pencil eigenvalue comprises a means for determining a higher-order statistic of the received signal.

9. The system of claim 8 wherein the higher-order statistic is a fourth-order cumulant of the received signal.

10. The system of claim 1 wherein the receiver means further comprises a multi-element sensor array.

11. In a method for locating a transmitter emitting a signal comprised of a plurality of symbols where the emitted signal is received by a receiver including an antenna with a plurality of antenna elements and a digitizer for providing a bit stream from the received symbols, the improvement comprising the step of determining a temporal dependence between bits of the bit stream indexed in time and determining the location of the transmitter from the temporal dependence.

12. The method of claim 11 wherein the improvement further comprises the step of determining a matrix pencil eigenvalue for at least one of said symbols.

13. The method of claim 12 wherein the improvement further comprises the step of determining the generalized eigenvalue decomposition of said matrix pencil eigenvalue.

14. The method of claim 13 wherein the improvement further comprises the step of determining a spatial variable of the matrix pencil eigenvalue.

15. The method of claim 14 wherein said spatial variable is a steering vector.

16. The method of claim 15 further comprising the step of determining the angle of arrival of the emitted signal as a function of said steering vector.

17. The method of claim 15 further comprising the step of determining the geolocation of said transmitter as a function of said steering vector.

18. The method of claim 11 wherein the communication signal has a received SNR less than 0 dB.

19. The method of claim 11 wherein the communication signal has a SNIR less than 0 dB at the receiver.

20. The method of claim 11 wherein the communication signal has a SNIR less than −6 dB at the receiver.

21. The method of claim 11 wherein the bits of the bit stream indexed in time are successive bits in the bit stream.

22. The method of claim 11 wherein the step of determining the location of the transmitter includes determining the angle of arrival of the emitted signal at the antenna.

23. A method for locating an uncooperative transmitter with a receiver including a multi-element array antenna which is geographically spaced apart from said transmitter, wherein said transmitter emits a signal with an unknown waveform, comprising the steps of:
receiving and digitizing the emitted signal to thereby produce a received signal;
determining a matrix pencil eigenvalue for at least a portion of said received signal;
determining a spatial variable of said matrix pencil eigenvalue; and,
determining the location of the transmitter based on the spatial variable.

24. The method of claim 23 wherein the step of determining the matrix pencil eigenvalue for the received signal includes the step of determining a spatial fourth-order cumulant.

25. The method of claim 23 wherein said spatial variable is a steering vector of the communication signal.

26. The method of claim 25 further comprising the step of determining the angle of arrival of the communication signal as a function of said steering vector.

27. The method of claim 26 further comprising the step of determining the geolocation of said transmitter as a function of said steering vector.

28. The method of claim 23, wherein the step of receiving and digitizing includes the step of organizing the digitized bits into blocks of data comprised of sequential snapshots wherein said snapshots are each comprised of a bit from each element of said multi-element array antenna.

29. The method of claim 28 wherein the matrix pencil eigenvalue is determined from said blocks of data.

30. The method of claim 29 wherein said block of data includes approximately 5000 snapshots.

31. The method of claim 23 wherein the communication signal has a received SNR less than 0 dB.

32. The method of claim 23 wherein the communication signal has a SNIR less than 0 dB at the receiver.

33. The method of claim 23 wherein the communication signal has a SNIR less than −6 dB at the receiver.

34. The method of claim 23 further comprising the steps of determining a generalized eigenvalue decomposition of the matrix pencil eigenvalue and determining the spatial variable from the generalized eigenvalue decomposition.

35. The method of claim 23 wherein the step of determining the matrix pencil eigenvalue further comprises the step of determining a higher-order statistic.

36. The method of claim 35 wherein the higher-order statistic is a fourth-order cumulant.

37. A method of tracking a transmitter emitting a signal with a known unique temporal characteristic, comprising the steps of:
receiving and digitizing a plurality of candidate signals to thereby produce a plurality of candidate received signals;
for each of said candidate received signals:
determining a matrix pencil eigenvalue;
determining a temporal characteristic;
determining a spatial variable of said matrix pencil eigenvalue;
associating the spatial variable with a temporal characteristic of the candidate received signal;
correlating the temporal characteristics of each candidate received signal with the known unique temporal characteristic; and,
retrieving the spatial variables associated with temporal characteristics of the candidate received signals that are highly correlated with the unique temporal characteristic to thereby facilitate tracking the transmitter.

38. The method of claim 37 wherein the step of determining the matrix pencil eigenvalue for each candidate received signal includes the step of determining a higher-order statistic.

39. The method of claim 38 wherein the higher-order statistic is a spatial fourth-order cumulant.

40. The method of claim 37 wherein said spatial variable is a steering vector of each candidate received signal.

41. The method of claim 40 further comprising the step of determining the angle of arrival of each candidate received signal as a function of said steering vector.

42. The method of claim 41 further comprising the step of determining the geolocation of said transmitter as a function of said steering vector.

43. In a method for determining the angle of arrival of a signal received at a receiver having a multi-element antenna array, the improvement comprising the step of determining the angle of arrival based on non-orthogonal eigenvectors selected from a generalized eigenvalue decomposition of a matrix pencil eigenvalue created from a fourth order cumulant of the received signal.

* * * * *